(12) United States Patent
Beri et al.

(10) Patent No.: US 12,367,658 B2
(45) Date of Patent: Jul. 22, 2025

(54) DETECTING AND RECOVERING PATTERNS IN DIGITAL RASTER IMAGES

(71) Applicant: Adobe Inc., San Jose, CA (US)

(72) Inventors: Tarun Beri, Noida (IN); Vineet Agarwal, Guwahati (IN); Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 484 days.

(21) Appl. No.: 17/932,478

(22) Filed: Sep. 15, 2022

(65) Prior Publication Data

US 2024/0096062 A1 Mar. 21, 2024

(51) Int. Cl.
*G06V 10/77* (2022.01)
*G06T 9/20* (2006.01)
*G06V 10/46* (2022.01)

(52) U.S. Cl.
CPC ............ *G06V 10/7715* (2022.01); *G06T 9/20* (2013.01); *G06V 10/46* (2022.01)

(58) Field of Classification Search
CPC ....... G06V 10/46; G06V 10/7715; G06T 9/20
See application file for complete search history.

(56) References Cited

U.S. PATENT DOCUMENTS

| | | | | |
|---|---|---|---|---|
| 6,269,177 | B1 * | 7/2001 | Dewaele | G06V 10/24 382/131 |
| 8,699,851 | B2 * | 4/2014 | Brasnett | G06F 16/785 386/241 |
| 2007/0154072 | A1 * | 7/2007 | Taraba | G06V 40/1335 382/124 |

OTHER PUBLICATIONS

Nedovic et al., "New Pixel Descriptors based on Neighborhood Similarity," May 9-10, 2020, The 5th Conference on Mathematics in Engineering: Theory and Applications Novi Sad, pp. 1-3. (Year: 2020).*
David Lowe. Distinctive image features from scale-invariant keypoints. International Journal of Computer Vision, 60:91-, 11 2004.
Tony Lindeberg. Scale-space theory: A basic tool for analysing structures at different scales. Journal of Applied Statistics, 21:224-270, Sep. 1994.
Andrew Willis and Yunfeng Sui. An algebraic model for fast corner detection. In 2009 IEEE 12th International Conference on Computer Vision, pp. 2296-2302, 2009.

(Continued)

Primary Examiner — Sam Bhattacharya
(74) Attorney, Agent, or Firm — Keller Preece PLLC

(57) ABSTRACT

Methods, systems, and non-transitory computer readable storage media are disclosed for automatically detecting and reconstructing patterns in digital images. The disclosed system determines structurally similar pixels of a digital image by comparing neighborhood descriptors that include the structural context for neighborhoods of the pixels. In response to identify structurally similar pixels of a digital image, the disclosed system utilizes non-maximum suppression to reduce the set of structurally similar pixels to collinear pixels within the digital image. Additionally, the disclosed system determines whether a group of structurally similar pixels define the boundaries of a pattern cell that forms a rectangular grid pattern within the digital image. The disclosed system also modifies a boundary of a detected pattern cell to include a human-perceived pattern object via a sliding window corresponding to the pattern cell.

20 Claims, 18 Drawing Sheets

(56) References Cited

OTHER PUBLICATIONS

Laptev and Lindeberg. Space-time interest points. In Proceedings Ninth IEEE International Conference on Computer Vision, pp. 432-439 vol. 1, 2003.
Rob J Hyndman and Anne B Koehler. Another look at measures of forecast accuracy. International Journal of Forecasting, pp. 679-688, 2006.
A. Neubeck and L. Van Gool. Efficient non-maximum suppression. In 18th International Conference on Pattern Recognition (ICPR'06), vol. 3, pp. 850-855, 2006.
Zhou Wang, Alan Conrad Bovik, Hamid Rahim Sheikh, Student Member, Eero P. Simoncelli, and Senior Member. Image quality assessment: From error visibility to structural similarity. IEEE Transactions on Image Processing, 13:600-612, 2004.
Daniel DeTone, Tomasz Malisiewicz, and Andrew Rabinovich. Superpoint: Self-supervised interest point detection and description. In Proceedings of the IEEE conference on computer vision and pattern recognition workshops, pp. 224-236, 2018.
Lei Huang and Zhen Li. Feature-based image registration using the shape context. International Journal of Remote Sensing, 31(8):2169-2177, 2010.
Karel Lenc and Andrea Vedaldi. Learning covariant feature detectors. In European conference on computer vision, pp. 100-117. Springer, 2016.
Stefan Leutenegger, Margarita Chli, and Roland Y. Siegwart. Brisk: Binary robust invariant scalable keypoints. In 2011 International Conference on Computer Vision, pp. 2548-2555, 2011.

\* cited by examiner

DETECTING AND RECOVERING PATTERNS IN DIGITAL RASTER IMAGES

BACKGROUND

Advancements in computer processing capabilities have led to improvements in digital image processing. Many industries utilize image processing techniques to process digital raster images by extracting image features and structures for various digital image editing tasks. For example, some digital image editing applications include tools for content searching, object detection, tagging, modifying image formats, etc., to modify digital images based on the image contents. Given the lossy nature of certain digital raster image formats (e.g., JPEG images), accurately detecting the pixel values and relationships between pixel values in a digital image is often difficult but important aspect of digital image processing. Specifically, digital image processing tasks that involve vectorizing digital image content rely on accurate detection of digital image content to produce accurate vectorized graphic content, which is more difficult with lossy digital raster image formats. Conventional image processing systems are limited in accuracy, flexibility, and efficiency of operation for certain digital image processing tasks involving repeated content in digital images.

SUMMARY

This disclosure describes one or more embodiments of methods, non-transitory computer readable media, and systems that solve the foregoing problems (in addition to providing other benefits) by automatically detecting and reconstructing patterns in digital images. Specifically, the disclosed systems determine structurally similar pixels of a digital image by comparing neighborhood descriptors that include the structural context for neighborhoods of the pixels. In response to identify structurally similar pixels of a digital image, the disclosed systems utilize non-maximum suppression to reduce the set of structurally similar pixels to collinear pixels within the digital image. Additionally, the disclosed systems determine whether a group of structurally similar pixels define the boundaries of a pattern cell that forms a rectangular grid pattern within the digital image. In one or more embodiments, the disclosed systems also modify a boundary of a detected pattern cell to include a human-perceived pattern object via a sliding window corresponding to the pattern cell. The disclosed systems thus provide accurate and efficient detection and reconstruction of a repeated pattern of a digital image for use in various digital image processing tasks.

BRIEF DESCRIPTION OF THE DRAWINGS

Various embodiments will be described and explained with additional specificity and detail through the use of the accompanying drawings in which.

DETAILED DESCRIPTION

Figure 1:
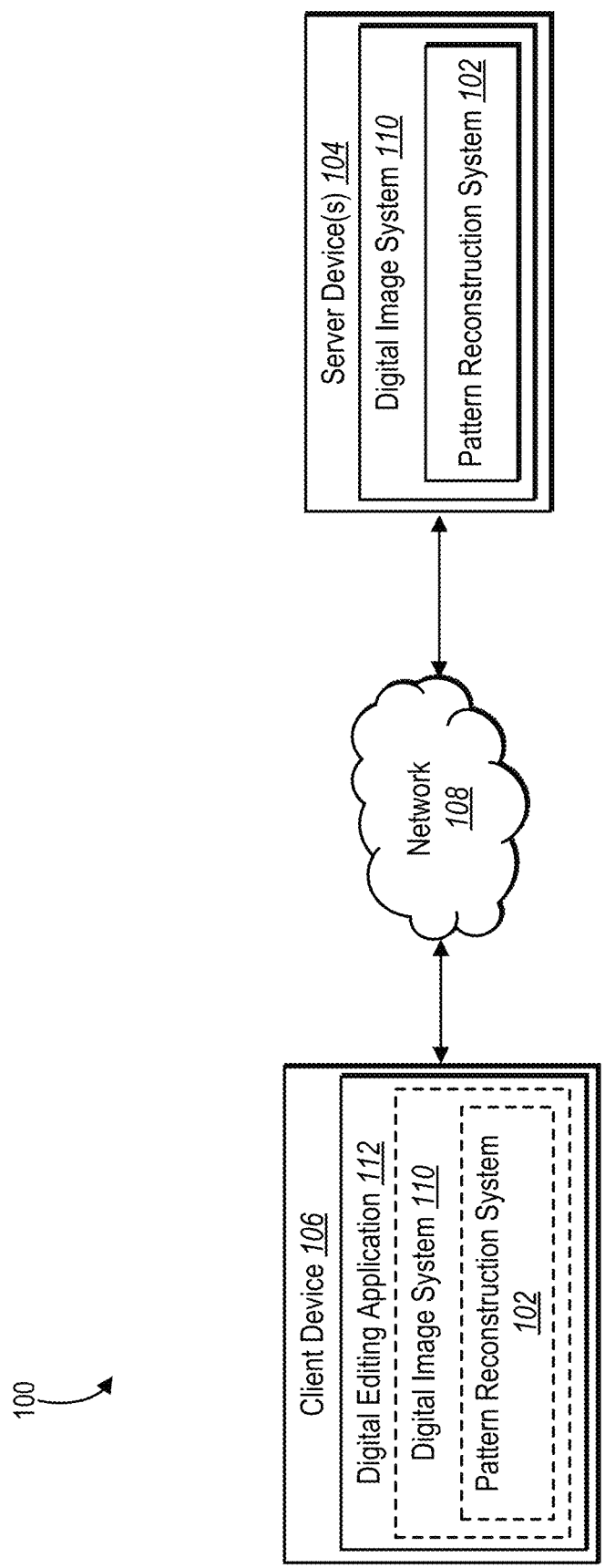
FIG. 1 illustrates an example system environment in which a pattern reconstructions system operates in accordance with one or more implementations.

This disclosure describes one or more embodiments of a pattern reconstruction system that extracts patterns from digital images. Specifically, the pattern reconstruction system determines whether a digital image includes repeated patterns based on detectable pattern cells. For example, the pattern reconstruction system generates proposals of pattern cells by detecting pixels with similar structural information at different locations of a digital image. Additionally, the pattern reconstruction system validates the generated proposals by verifying that collinear pixels are positioned at consistent intervals in rows and columns throughout the image. The pattern reconstruction system also verifies a detected pattern cell based on a difference between the digital image and a reconstructed digital image with the pattern cell. In one or more embodiments, the pattern reconstruction system utilizes a sliding window process to center the detected pattern cell on a pattern object to optimize the pattern cell for human perception.

As mentioned, in one or more embodiments, the pattern reconstruction system identifies pixels with similar structural information from a digital image (e.g., a digital raster image). In particular, the pattern reconstruction system generates neighborhood descriptors for pixels of a digital image based on pixel values within the pixel neighborhoods. For example, the pattern reconstruction system generates a neighborhood descriptor to indicate structural information for a pixel based on pixel values in a predetermined region around the pixel.

In one or more embodiments, the pattern reconstruction system determines a set of pixels similar to a pivot pixel selected/sampled from a digital image in a proposal generation process. Specifically, the pattern reconstruction system compares a neighborhood descriptor of the pivot pixel to neighborhood descriptors of a plurality of additional pixels of the digital image. Additionally, the pattern reconstruction system determines additional pixels that have similar structural information to the pivot pixel in response to determining that the corresponding neighborhood descriptors are within a threshold of the neighborhood descriptor of the pivot pixel.

According to one or more embodiments, the pattern reconstruction system verifies that a set of pixels similar to a pivot pixel form a rectangular grid pattern within a digital image. For instance, the pattern reconstruction system reduces the set of pixels by utilizing a non-maximum suppression model to remove structurally similar pixels from the set that are not collinear to the pivot pixel. The pattern reconstruction system also determines whether the remaining collinear pixels in the set are positioned at regular intervals throughout the digital image, thereby forming a repeatable pattern cell. In some embodiments, the pattern reconstruction system also determines a reconstruction error based on a difference between the digital image and a reconstructed digital image with the detected pattern cell.

In one or more additional embodiments, the pattern reconstruction system refines a pattern cell to center the pattern cell on a detected pattern object (e.g., a detected repeating unit). Specifically, the pattern reconstruction system utilizes a sliding window within a region corresponding to the pattern cell to evaluate possible positions of the pattern cell relative to a pattern object and/or a background of the digital image. To illustrate, the pattern reconstruction system compares boundary pixels of the sliding window to adjacent, exterior pixels (e.g., based on the corresponding neighborhood descriptors) to detect a gutter region that includes a contiguous background portion (e.g., contiguous background pixels) of the digital image or a tightly packed pattern object. Additionally, the pattern reconstruction system reconstructs the pattern object by modifying a boundary of the pattern cell in response to detecting portions of the background and/or pattern object based on the sliding window.

Accordingly, in one or more embodiments, the pattern reconstruction system generates, evaluates, and refines a proposal of a pattern cell for reconstructing a pattern of a digital image. In particular, the pattern reconstruction system generates and evaluates a plurality of proposals of pattern cells utilizing random sampling or key point detection in the digital image to generate proposals for detecting a repeatable pattern in the digital image. Additionally, in one or more embodiments, in response to reconstructing a pattern object from a digital image, the pattern reconstruction system utilizes the reconstructed pattern object to vectorize the digital image including a modifiable vector-based pattern based on the pattern object.

As mentioned, conventional systems for editing and vectorizing digital images have a number of shortcomings in relation to efficiency, flexibility, and accuracy of operation. In particular, due to the lossy nature of many digital image formats such as JPEGs, structural information corresponding to base cells of repeated patterns in digital images is often lost given the pixel-only nature of digital raster images. Conventional systems that process digital images are typically unable to determine the high-level organization of repetitive content of digital images. For instance, while conventional systems that utilize object detection are able to visually separate distinct objects in a scene, such conventional systems are unable to accurately detect a repeating pattern due to the lost structural information in digital raster images. Accordingly, such conventional systems inaccurately reproduce such patterns when vectorizing the contents of the digital raster images.

In addition to inaccurately reproducing patterns in digital raster image content in vector formats, conventional systems utilize digital image processes that inefficiently process digital raster images during vectorization. For example, conventional systems typically vectorize digital images by reconstructing all of the contents of a digital raster image into vector format. Such processes often require a significant amount of time and/or computing power to generate many different vectors according to the different pixels in a digital raster image. Accordingly, inaccurate or lossy pixel data in a digital raster image often results in extra/wasted processing to vectorize the inaccurate pixel data.

Furthermore, because conventional systems are unable to extract high-level information about patterns from digital raster images, the conventional systems are limited to specific use cases. For instance, as mentioned above, conventional systems that utilize existing vectorization techniques to reconstruct all content in a digital raster image generate a plurality of separate vectors with which a user is able to interact. While the conventional systems generate editable digital vector images, the conventional systems limit user interactions according to conventional vector-based tools. Accordingly, because the conventional systems lack the high-level context associated with repeating patterns in digital raster images, users are limited in extending or modifying the patterns after vectorization (or other reconstruction) of the digital raster images.

The disclosed pattern reconstruction system provides a number of advantages over conventional systems. For example, the pattern reconstruction system improves the accuracy of computing systems that process digital images. In contrast to conventional systems that inaccurately reconstruct patterns in digital images due to lost pixel information, the pattern reconstruction system accurately detects repeating patterns in digital images based on pixel similarities across the digital images. In particular, by extracting structural information about pixels in a digital image using neighborhood descriptors, the pattern reconstruction system detects similar pixels that form pattern cells in a rectangular grid pattern. For example, by determining that a neighborhood descriptor of a particular pixel is similar to neighborhood descriptors of a set of pixels within a threshold, the pattern reconstruction system accurately determines repeating pattern objects in a digital image while providing tolerance for lost pixel data in lossy image formats.

The pattern reconstruction system also improves the flexibility of computing systems that vectorize digital raster images. In contrast to conventional systems that are unequipped to extract high-level pattern data from digital raster images during vectorization, the pattern reconstruction system accurately detects repeating patterns of different types from digital raster images. Specifically, by reconstructing an individual pattern cell from a repeating pattern in a digital image, the pattern reconstruction system provides customizable patterns in digital images based on the detected pattern cell. To illustrate, the pattern reconstruction system extracts a pattern cell including a human-perceived pattern object and provides tools for generating grid-repeatable digital image content based on the pattern cell. Additionally, the pattern reconstruction system provides tools for generating a digital library asset from an extracted pattern cell for use in a variety of different digital image applications (e.g., digital raster applications or digital vector applications).

Furthermore, the pattern reconstruction system provides improved efficiency of computing systems that vectorize digital raster images. In contrast to conventional systems that vectorize all content in a digital raster image, the pattern reconstruction system provides extraction and vectorization of individual pattern cells from digital images. In particular, by reconstructing an individual pattern cell corresponding to a repeating pattern in a digital raster image, the pattern reconstruction system reduces the amount of computing resources and time needed to vectorize the digital raster image. For example, the pattern reconstruction system utilizes the reconstructed pattern cell to vectorize a pattern by inserting a plurality of instances of the vectorized pattern cell into a digital vector image without needing to extract and generate the same or similar paths for all recurrences of the pattern cell according to lossy content of the digital raster image.

Turning now to the figures, FIG. 1 includes an embodiment of a system environment 100 in which a pattern reconstruction system 102 is implemented. In particular, the system environment 100 includes server device(s) 104 and a client device 106 in communication via a network 108. Moreover, as shown, the server device(s) 104 include a digital image system 110, which includes the pattern reconstruction system 102. Additionally, the client device 106 includes a digital image application 112, which optionally includes the digital image system 110 and the pattern reconstruction system 102.

As shown in FIG. 1, the server device(s) 104 includes or hosts the digital image system 110. The digital image system 110 includes, or is part of, one or more systems that implement digital image editing operations. For example, the digital image system 110 provides tools for performing various operations on digital images. To illustrate, the digital image system 110 communicates with the client device 106 via the network 108 to provide the tools for display and interaction via the digital image application 112 at the client device 106. Additionally, in some embodiments, the digital image system 110 receives data from the client device 106 in connection with editing digital images, including requests to access digital images stored at the server device(s) 104 (or at another device such as a digital content database) and/or requests to store digital images from the client device 106 at the server device(s) 104 (or at another device). In some embodiments, the digital image system 110 receives interaction data for viewing, generating, or editing a digital image from the client device 106, processes the interaction data (e.g., to view, generate, or edit a digital image), and provides the results of the interaction data to the client device 106 for display via the digital image application 112 or to a third-party system.

According to one or more embodiments, the digital image system 110 utilizes the pattern reconstruction system 102 to extract patterns from digital images. In particular, in response to receiving a request to reconstruct a pattern from a digital image, the digital image system 110 utilizes the pattern reconstruction system 102 to extract a pattern object from a digital image. For example, the pattern reconstruction system 102 extracts and reconstructs patterns from digital raster images for use in a variety of applications. To illustrate, the pattern reconstruction system 102 extracts pattern objects from repeatable patterns in digital raster images for vectorizing the patterns in digital vector images. In additional embodiments, the pattern reconstruction system 102 generates digital library assets based on extracted patterns for inserting into digital raster images or digital vector images. In some embodiments, the digital image system 110 provides an extracted pattern and/or a resulting digital vector image or digital library asset to the client device 106 (e.g., for display within the digital image application 112).

In one or more embodiments, the server device(s) 104 include a variety of computing devices, including those described below with reference to FIG. 13. For example, the server device(s) 104 includes one or more servers for storing and processing data associated with editing digital images and extracting patterns. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13. Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with a variety of digital images. In some embodiments, the client device 106 also performs functions for generating, capturing, or accessing data to provide to the digital image system 110 and the pattern reconstruction system 102 in connection with editing digital content. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 communicate directly). Furthermore, although FIG. 1 illustrates the pattern reconstruction system 102 being implemented by a particular component and/or device within the system environment 100, the pattern reconstruction system 102 is implemented, in whole or in part, by other computing devices and/or components in the system environment 100 (e.g., the client device 106).

In particular, in some implementations, the pattern reconstruction system 102 on the server device(s) 104 supports the pattern reconstruction system 102 on the client device 106. For instance, the server device(s) 104 generates or obtains the pattern reconstruction system 102 for the client device 106. The server device(s) 104 provides the pattern reconstruction system 102 to the client device 106 for performing a pattern reconstruction process at the client device 106. In other words, the client device 106 obtains (e.g., downloads) the pattern reconstruction system 102 from the server device(s) 104. At this point, the client device 106 is able to utilize the pattern reconstruction system 102 to customize digital content tutorials for digital image editing tasks independently from the server device(s) 104.

In alternative embodiments, the pattern reconstruction system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital content editing operations or select a digital content tutorial, and, in response, the pattern reconstruction system 102 or the digital image system 110 on the server device(s) 104 performs operations to reconstruct patterns from digital images and/or for digital image vectorization operations. The server device(s) 104 provide the output or results of the operations to the client device 106.

Figure 2:
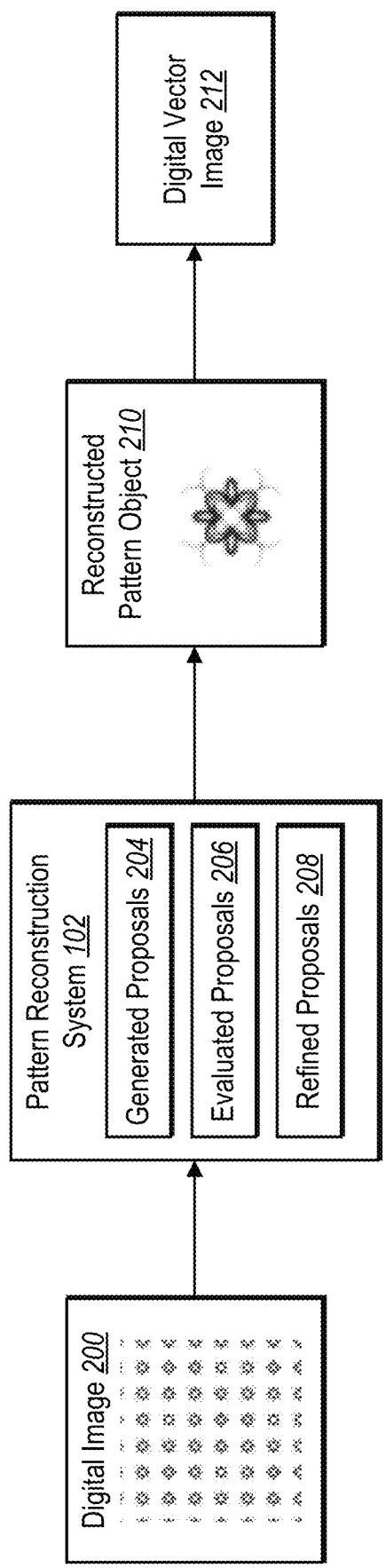
FIG. 2 illustrates a diagram of an overview of the pattern reconstruction system reconstructing a pattern from a digital image for a digital vector image in accordance with one or more implementations.

As mentioned, the pattern reconstruction system 102 detects and reconstructs patterns in digital images. FIG. 2 illustrates an overview of the pattern reconstruction system 102 extracting a pattern from a digital image in connection with vectorizing the digital image. More specifically, FIG. 2 illustrates that the pattern reconstruction system 102 utilizes a pattern proposal process to detect and refine pattern objects in a digital image in connection with vectorizing the digital content in the digital image.

As illustrated in FIG. 2, the pattern reconstruction system 102 determines a digital image 200 including a pattern. Specifically, in one or more embodiments, the digital image 200 includes a computer representation of digital content. In one or more embodiments, the digital image 200 includes a digital raster image, which includes pixel-based image data that represents image content via pixel values. For example, the pattern reconstruction system 102 identifies the digital image 200 in response to a request to vectorize the contents of the digital image 200 (e.g., by converting the pixel-based image data to vector-based image data).

As illustrated in FIG. 2, the pattern reconstruction system 102 performs a pattern detection/reconstruction process on the digital image 200 to extract a pattern from the digital image. In one or more embodiments, a pattern includes a repeating design in a digital image. For example, a pattern includes a repeating set of pattern cells that form a rectangular grid within a digital image. To illustrate, the digital image 200 includes a plurality of pattern cells with a visually repeated pattern object at specific intervals (e.g., horizontally and vertically) within the digital image 200. In some instances, patterns include tightly packed objects or continuously repeating and connected visual elements (e.g., with no visible separation or very little separation between separate objects). In additional instances, patterns include spatially separated pattern objects (e.g., with a visible separation between separate objects).

FIG. 2 illustrates that the pattern reconstruction system 102 utilizes a multi-phase proposal process to reconstruct a pattern in the digital image 200. In particular, the pattern reconstruction system 102 generates a plurality of proposals of pattern cells to replicate a rectangular grid pattern in the digital image 200, resulting in a plurality of generated proposals 204. Additionally, the pattern reconstruction system 102 evaluates the proposals of the pattern cells based on how well the proposals recreate the rectangular grid pattern, resulting in one or more evaluated proposals 206. The pattern reconstruction system 102 also refines one or more proposals of pattern cells to modify a pattern cell (e.g., by shifting or shrinking a boundary of the pattern cell), resulting in one or more refined proposals 208. FIGS. 3, 4A-4B, and 5 and the corresponding description provide additional detail with respect to the proposal generation, evaluation, and refinement processes.

In one or more embodiments, as illustrated in FIG. 2, the pattern reconstruction system 102 generates a reconstructed pattern object 210 from the digital image 200. For example, as mentioned, the pattern reconstruction system 102 determines a pattern cell utilizing the multi-phase proposal process. Additionally, the pattern reconstruction system 102 determines the reconstructed pattern object 210 based on the refinement portion of the proposal process. In some embodiments, the pattern reconstruction system 102 thus generates a human-perceived pattern object based on the pattern cell.

As illustrated in FIG. 2, in one or more embodiments, the pattern reconstruction system 102 utilizes the reconstructed pattern object 210 to generate a digital vector image 212. For example, the pattern reconstruction system 102 generates the digital vector image 212 by utilizing the reconstructed pattern object 210 to vectorize the contents of the digital image 200. In one or more embodiments, the digital vector image 212 includes visual content of the digital image 200 represented utilizing one or more vectors with corresponding attributes. To illustrate, the pattern reconstruction system 102 reconstructs the pattern of the digital image 200 to generate a plurality of vectors representing a plurality of instances of the reconstructed pattern object 210 that form a rectangular grid pattern. In alternative embodiments, the pattern reconstruction system 102 generates a standalone digital library asset including the reconstructed pattern object 210.

Figure 3:
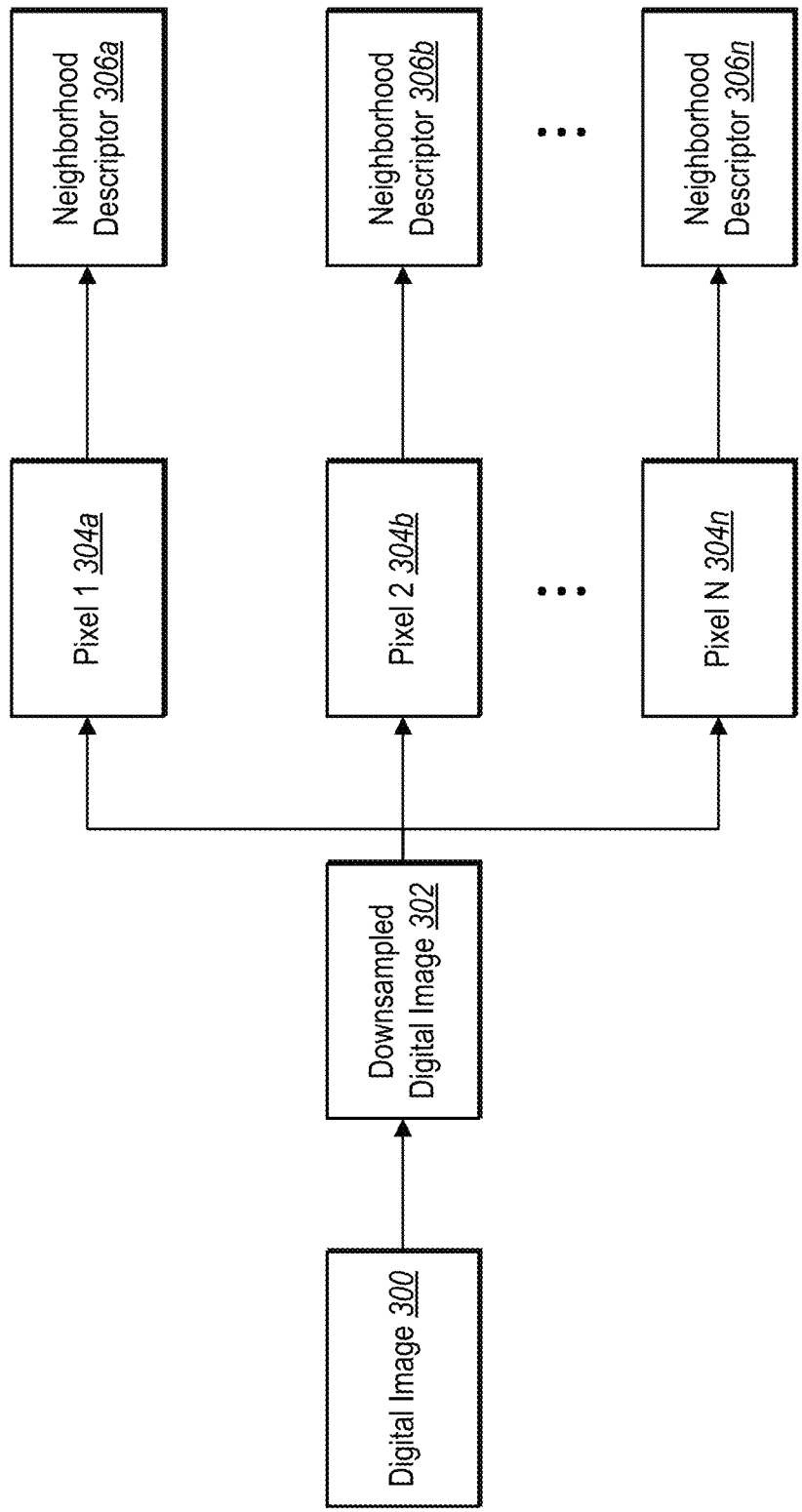
FIG. 3 illustrates a diagram of the pattern reconstruction system generating neighborhood descriptors for pixels of a digital image in accordance with one or more implementations.

In one or more embodiments, in connection with detecting a pattern in a digital image, the pattern reconstruction system 102 generates structural representations of pixels of the digital image. Specifically, the pattern reconstruction system 102 generates the structural representations of the pixels by incorporating local context information associated with each pixel into a corresponding structural representation for the pixel. FIG. 3 illustrates an embodiment of the pattern reconstruction system 102 generating a plurality of neighborhood descriptors including the local context information for pixels of a digital image.

According to one or more embodiments, the pattern reconstruction system 102 generates a downsampled digital image 302 from the digital image 300. For example, the pattern reconstruction system 102 downsamples the digital image 300 to a predetermined image resolution. In one or more embodiments, the pattern reconstruction system 102 downsamples the digital image 300 to 512 pixels in the dominant direction while maintaining the aspect ratio of the digital image 300 (or another resolution such as 1024 pixels in the dominant direction). To illustrate, in one or more embodiments, the pattern reconstruction system 102 generates the downsampled digital image 302 to provide consistent processing of digital images of different qualities with high performance and low memory/processing requirements. Although FIG. 3 illustrates that the pattern reconstruction system 102 downsamples the digital image 300, in alternative embodiments, the pattern reconstruction system 102 processes the digital image 300 without downsampling (e.g., for smaller resolutions).

As illustrated in FIG. 3, the pattern reconstruction system 102 generates structural representations of a plurality of pixels 304a-304n of the downsampled digital image 302. In one or more embodiments, the pattern reconstruction system 102 identifies a plurality of pixels 304a-304n in the downsampled digital image 302 (e.g., all pixels or a subset of pixels a predetermined distance from edges of the downsampled digital image 302). Additionally, the pattern reconstruction system 102 creates neighborhood descriptors 306a-306n for the identified pixels 304a-304n in the downsampled digital image 302 to represent the contextual structure for each pixel.

According to one or more embodiments, the pattern reconstruction system 102 generates a neighborhood descriptor for a pixel by determining pixel data for a region associated with the pixel. In one or more embodiments, a neighborhood descriptor of a pixel includes contextual visual information associated with a region of the pixel. In particular, the pattern reconstruction system 102 generates the neighborhood descriptor as a structural signature of a pixel that represents the pixel based on regional information extracted from nearby pixels. Accordingly, the values in the neighborhood descriptors of pixels of a digital image depend on the pixel values of pixels within corresponding local neighborhoods.

For instance, the pattern reconstruction system 102 generates a first neighborhood descriptor 306a for a first pixel 304a of the downsampled digital image 302 by determining a plurality of pixels within a neighborhood of the first pixel 304a. To illustrate, the pattern reconstruction system 102 determines a region of pixels surrounding the first pixel 304a. The pattern reconstruction system 102 generates the first neighborhood descriptor 306a comprising a vector/array or a matrix of pixel values (e.g., color values) corresponding to the pixels within the neighborhood of the first pixel 304a. Accordingly, the pattern reconstruction system 102 incorporates contextual structure of each pixel into the neighborhood descriptors 306a-306n based on the nearby pixel values.

In one or more embodiments, the pattern reconstruction system 102 generates the neighborhood descriptors 306a-306n based on regions of predetermined regions and sizes corresponding to the pixels 304a-304n. Specifically, the pattern reconstruction system 102 determines a neighborhood of a pixel based on a predetermined range of additional pixels centered at the pixel. For example, for generating the first neighborhood descriptor 306a, the pattern reconstruction system 102 determines the neighborhood to include a 9×9 set of pixels centered at the first pixel 304a. In alternative embodiments, the pattern reconstruction system 102 determines the neighborhood to include a 15×15 set of pixels centered at the first pixel 304a.

According to one or more embodiments, the pattern reconstruction system 102 selects the neighborhoods corresponding to the pixels 304a-304n according to various criteria associated with a computing device and/or the digital image. For instance, the pattern reconstruction system 102 determines a size of neighborhoods for the neighborhood descriptors 306a-306n based on a resolution size of the digital image 300 or image frequencies. To illustrate, the pattern reconstruction system 102 utilizes larger neighborhoods for digital images with certain resolutions and/or image frequencies and smaller neighborhoods for digital images with additional other resolutions and/or other image frequencies. Furthermore, the pattern reconstruction system 102 utilizes larger neighborhoods or smaller neighborhoods based on the amount of available computing resources or based on user preferences. In additional embodiments, the pattern reconstruction system 102 generates neighborhood descriptors with different shapes such as rectangles, circles, or other shapes.

In one or more additional embodiments, the pattern reconstruction system 102 performs a plurality of proposal generation/evaluation operations utilizing neighborhood descriptors of different sizes and/or shapes. In particular, the pattern reconstruction system 102 generates neighborhood descriptors including a first size/shape (e.g., 9×9 squares centered on the pixels) for a first proposal generation/evaluation operation for a digital image. In response to determining that the neighborhood descriptors of the first size/shape do not result in a rectangular grid pattern formed from valid pattern cells for the digital image, the pattern reconstruction system 102 generates neighborhood descriptors including a second size/shape (e.g., 15×15 squares centered on the pixels) for a second proposal generation/evaluation operation for the digital image.

Figure 4A:
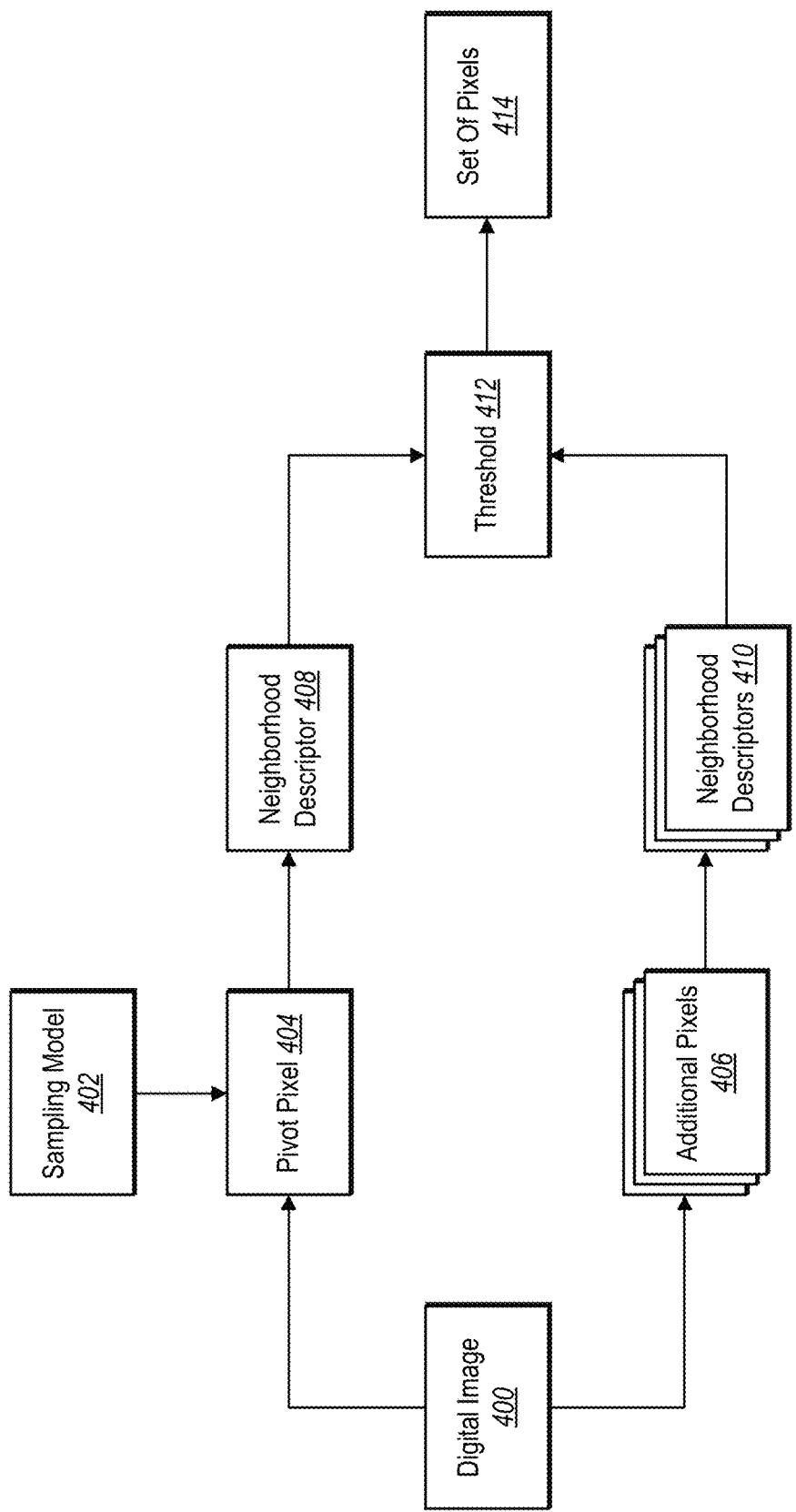
FIGS. 4A-4C illustrate diagrams of the pattern reconstruction system determining a set of structurally similar pixels of a digital image for proposals of pattern cells in accordance with one or more implementations.
Figure 4B:
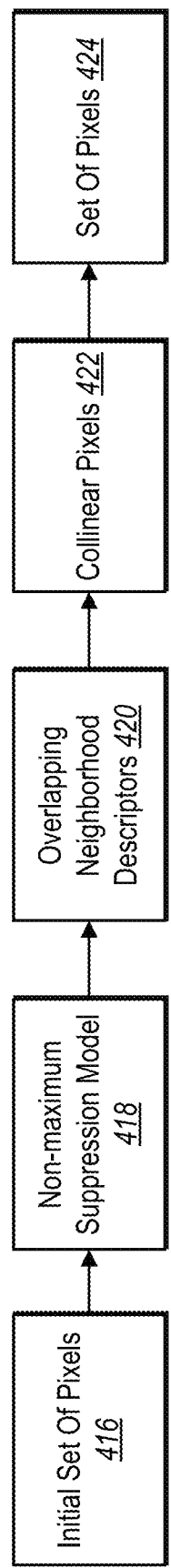

In one or more embodiments, in response to generating neighborhood descriptors including regional structural information for pixels of a digital image, the pattern reconstruction system 102 samples one or more pixels of the digital image to generate proposals for pattern cells. For example, FIGS. 4A-4B illustrate diagrams of the pattern reconstruction system 102 determining similar pixels that correspond to candidate pattern cells in a digital image. More specifically, FIG. 4A illustrates the pattern reconstruction system 102 determining a set of pixels according to similarities of structural information of the pixels in the digital image. Furthermore, FIG. 4B illustrates the pattern reconstruction system 102 refining a set of pixels corresponding to candidate pattern cells in the digital image.

As mentioned, FIG. 4A illustrates the pattern reconstruction system 102 determining a set of similar pixels based on structural information of pixels of a digital image 400. Specifically, FIG. 4A illustrates that the pattern reconstruction system 102 utilizes a sampling model 402 to sample one or more pixels of the digital image 400. More specifically, the pattern reconstruction system 102 utilizes the sampling model 402 to test for candidate pattern cells. For example, the pattern reconstruction system 102 utilizes the sampling model to determine a subset of pixels from the digital image 400 for finding recurrences of pixel structures within the digital image 400.

In one or more embodiments, the sampling model 402 includes a random sampling model that randomly samples a plurality of pixels of the digital image 400 to test for candidate pattern cells. To illustrate, the pattern reconstruction system 102 randomly samples a predetermined number of pixels from the digital image 400 to test for candidate pattern cells. In some instances, the pattern reconstruction system 102 samples 15 pixels from the digital image 400. Alternatively, the pattern reconstruction system 102 samples a different number of pixels from the digital image (e.g., 10 or 20 pixels).

In one or more additional embodiments, the pattern reconstruction system 102 eliminates one or more portions of the digital image 400 from sampling. For example, the pattern reconstruction system 102 removes a background portion of the digital image 400 prior to sample to avoid sampling from the background portion. To illustrate, the pattern reconstruction system 102 utilizes a background removal model that automatically separates foreground portions and background portions of the digital image 400 and removes the background portions. Thus, the pattern reconstruction system 102 utilizes the sampling model 402 to sample only foreground pixels.

In alternative embodiments, to reduce processing requirements, the pattern reconstruction system 102 detects a most-occurring color (e.g., the highest number of instances of a particular color value) in the digital image 400 and determines that the most-occurring color likely corresponds to a background portion of the digital image 400. The pattern reconstruction system 102 removes the most-occurring color from the digital image 400 prior to utilizing the sampling model 402. In additional embodiments, the pattern reconstruction system 102 identifies the most-occurring color and identifies adjacent pixels of the most-occurring color that are within a threshold range of color values of the most-occurring color as belonging to the background portion. Thus, the pattern reconstruction system 102 provides tolerance for lost/modified color values in lossy images for background removal.

In one or more alternative embodiments, the pattern reconstruction system 102 utilizes the sampling model 402 including a key point detection model to sample pixels of the digital image 400. For example, the pattern reconstruction system 102 utilizes the sampling model 402 to detect key points of a digital image according to objects and/or other visual information in the digital image. To illustrate, the pattern reconstruction system 102 utilizes the sampling model 402 to sample pixels of the digital image 400 from specific foreground objects and/or specific portions of foreground objects. Furthermore, in one or more embodiments, the pattern reconstruction system 102 utilizes the sampling model 402 including an object detection model to determine pixels that provide a highest probability of corresponding to a pattern cell.

In one or more embodiments, in response to sampling a plurality of pixels of the digital image 400, the pattern reconstruction system 102 tests each sampled point for candidate pattern cells. As illustrated in FIG. 4A, the pattern reconstruction system 102 determines a pivot pixel 404 from the sampled pixels to test for a candidate pattern cell. Specifically, the pattern reconstruction system 102 determines whether the pivot pixel 404 corresponds to one or more pixels in the digital image 400 having similar structural information.

For example, the pattern reconstruction system 102 compares a neighborhood descriptor 408 associated with the pivot pixel 404 to neighborhood descriptors 410 of additional pixels 406 in the digital image 400. In one or more embodiments, the pattern reconstruction system 102 compares the neighborhood descriptor 408 of the pivot pixel 404 to the neighborhood descriptors 410 of all additional pixels 406 in the digital image 400. In alternative embodiments, the pattern reconstruction system 102 compares the neighborhood descriptor 408 of the pivot pixel 404 to neighborhood descriptors of a subset of pixels in the digital image 400 (e.g., excluding pixels at the edges of the digital image 400, or pixels excluding background pixels of the digital image 400).

By comparing the neighborhood descriptor 408 of the pivot pixel 404 to the neighborhood descriptors 410 of the additional pixels 406, the pattern reconstruction system 102 determines whether the pivot pixel 404 has the same or similar regional structural information to any other pixels in the digital image. For example, as illustrated in FIG. 4A, the pattern reconstruction system 102 compares the neighborhood descriptor 408 to the neighborhood descriptors 410 to identify pixels within the digital image 400 that have similar regional structural makeups. To illustrate, the pattern reconstruction system 102 determines that neighborhood descriptors have the same values indicate that the corresponding pixels have the same regional structural information. Furthermore, the pattern reconstruction system 102 determines that neighborhood descriptors having different values indicate that the corresponding pixels have different regional structural information.

In one or more embodiments, the pattern reconstruction system 102 compares the neighborhood descriptor 408 of the pivot pixel 404 to the neighborhood descriptors 410 of the additional pixels 406 in connection with a threshold 412. To illustrate, the pattern reconstruction system 102 utilizes the threshold 412 to determine similar pixels to the pivot pixel 404 within a certain tolerance due to possible structural loss in lossy images. More specifically, structurally lossy images often have a high variance of color values relative to original/intended color values. Accordingly, the pattern reconstruction system 102 is able to control for potential lost pixel data in lossy formats by utilizing the threshold 412 to determines pixels with little or no structural variation according to the predetermined tolerance.

In various embodiments, the pattern reconstruction system 102 determines the threshold 412 based on a resolution of the digital image. To illustrate, the pattern reconstruction system 102 utilizes a higher threshold value to accurately detect similar pixels in a low-resolution digital image with potentially high lost pixel data. Additionally, the pattern reconstruction system 102 utilizes a lower threshold value to detect similar pixels for high resolution digital images without accidentally identifying too many similar pixels, which often causes subsequent pattern detection operations to fail. For example, for low resolution images, the pattern reconstruction system 102 utilizes a higher threshold value (e.g., 5% within each color channel of corresponding pixel values of two neighborhood descriptors) to determine whether the corresponding pixels are similar. Furthermore, for high resolution images, the pattern reconstruction system 102 utilizes a lower threshold value (e.g., 2% within each color channel) to determine whether the corresponding pixels are similar. In additional embodiments, the pattern reconstruction system 102 determines whether a threshold number of pixel values of two neighborhood descriptors are within a threshold value.

In response to determining that the neighborhood descriptor 408 of the pivot pixel 404 and an additional neighborhood descriptor of an additional pixel are within the threshold 412, the pattern reconstruction system 102 adds the additional pixel to a set of pixels 414. In particular, the pattern reconstruction system 102 determines the set of pixels 414 as a subset of the additional pixels 406 that qualify as pixels in candidate pattern cells. Accordingly, the pattern reconstruction system 102 continues adding pixels to the set of pixels 414 in response to determining that the pixels have similar regional structural information to the pivot pixel 404 according to the threshold 412. Furthermore, in response to determining that a particular pixel does not meet the threshold 412 (e.g., based on the corresponding neighborhood descriptor), the pattern reconstruction system 102 does not add the particular pixel to the set of pixels 414.

In one or more embodiments, the pattern reconstruction system 102 also utilizes one or more additional operations to reduce the number of pixels in a set of pixels similar to a pivot pixel. Specifically, as mentioned, FIG. 4B illustrates that the pattern reconstruction system 102 limiting a set of pixels similar to a pivot pixel based on positions of the pixels within a digital image. For example, while utilizing a threshold provides indications of the most similar pixels to a pivot pixel in a digital image, certain types of patterns result in a large number of similar pixels to a pivot pixel. Accordingly, the pattern reconstruction system 102 utilizes one or more additional operations to determine the most likely pixels that form pattern cells in a rectangular grid pattern with the pivot pixel.

As illustrated in FIG. 4B, the pattern reconstruction system 102 determines an initial set of pixels 416 with similar structural information to a pivot pixel. For instance, the pattern reconstruction system 102 determines the set of pixels 414 of FIG. 4A as the initial set of pixels 416. Thus, the pattern reconstruction system 102 determines the initial set of pixels 416 including a plurality of pixels in the digital image that have neighborhood descriptors similar to the neighborhood descriptor of the pivot pixel (e.g., within a threshold).

In one or more embodiments, the pattern reconstruction system 102 also determines whether pixels in the initial set of pixels 416 possibly form a pattern cell with the pivot pixel. In particular, the pattern reconstruction system 102 reduces the initial set of pixels 416 by eliminating overlapping structurally similar pixels. For example, because spatially collocated pixels in a digital image can share a significant portion of their local neighborhoods, the pattern reconstruction system 102 utilizes a non-maximum suppression model 418 on the initial set of pixels 416 to eliminate pixels that are unlikely to produce pattern cells that form a rectangular grid pattern. To illustrate, the pattern reconstruction system 102 utilizes a modified version of the non-maximum suppression model as described by Alexander Neubeck and Luc Van Gool in "Efficient non-maximum suppression," in ICPR (2006) (hereinafter "Neubeck"), which is hereby incorporated by reference in its entirety.

Specifically, the pattern reconstruction system 102 utilizes non-maximum suppression to filter out overlapping objects that rank low on a scoring metric relative to an object with a maximum score. For instance, the pattern reconstruction system 102 utilizes the non-maximum suppression model 418 to generate a disjoin (non-overlapping) collection of objects, each of which exhibit a higher score than other objects with which it overlaps. More specifically, the pattern reconstruction system 102 utilizes the non-maximum suppression model 418 to determine overlapping neighborhood descriptors 420 and select the highest scoring neighborhood descriptor (and its corresponding pixel) in the overlapping neighborhood descriptors 420.

In one or more embodiments, as described in Neubeck, the pattern reconstruction system 102 utilizes the non-maximum suppression model 418 including an Intersection Over Union ("IOU") metric. The IOU measure indicates a ratio of the area of intersection between two objects to their union area. Accordingly, the pattern reconstruction system 102 utilizes the non-maximum suppression model 418 to use a scoring metric that is inversely proportional to the structural difference between neighborhood descriptors of pixels. Additionally, the pattern reconstruction system 102 generates the IOU metric from neighborhood descriptors around respective pixels.

As mentioned, the pattern reconstruction system 102 utilizes a modified non-maximum suppression model to detect similar pixels that are likely to form pattern cells in a rectangular grid pattern. For example, the pattern reconstruction system 102 modifies the non-maximum suppression model 418 to prevent suppression of structurally similar patterns in the same row and column as the pivot pixel. To illustrate, the pattern reconstruction system 102 modifies the non-maximum suppression model 418 by boosting scores of pixels in the same row and column as the pivot pixel (e.g., by a threshold amount such as 5-10%). Accordingly, the non-maximum suppression model 418 selects the highest scoring pixels in the regions of overlapping neighborhood descriptors 420 while also selecting pixels that are structurally similar to the pivot pixel within the same row/column as the pivot pixel.

In one or more embodiments, in response to determining a set of pixels with similar structural information as a pivot pixel and that are likely to form a rectangular grid pattern with the pivot pixel, the pattern reconstruction system 102 validates placement of the identified pixels relative to the pivot pixel. Specifically, in addition to boosting pixels in the same row/column in the non-maximum suppression model 418, the pattern reconstruction system 102 determines collinear pixels 422 corresponding to the pivot pixel that are likely to form a rectangular grid pattern. The pattern reconstruction system 102 determines whether similar pixels identified utilizing the non-maximum suppression model 418 can form a rectangular grid pattern in the digital image.

To illustrate, the pattern reconstruction system 102 identifies two structurally similar pixels that are closest to the pivot pixel (e.g., one in the same row as the pivot pixel and one in the same column as the pivot pixel). In one or more embodiments, the pattern reconstruction system 102 determines distances between the pivot pixel and the two closest pixels in the same row and column. For instance, the pattern reconstruction system 102 determines a first distance between the pivot pixel and a first pixel closest to the pivot pixel in the same row and a second distance between the pivot pixel and a second pixel closest to the pivot pixel in the same column. The pattern reconstruction system 102 utilizes the first and second distance to determine whether additional similar pixels in the same row and column as the pivot pixel are positioned at equal intervals across the digital image.

In one or more embodiments, the pattern reconstruction system 102 estimates a maximum number of possible collinear samples based on the image size and the first and second distances. Additionally, the pattern reconstruction system 102 determines whether the pivot pixel results in collinear pixels that form a rectangular grid pattern according to the estimated maximum number of possible collinear samples. To illustrate, the pattern reconstruction system 102 determines a set of pixels 424 that form a rectangular grid pattern within the digital image in response to determining that the collinear pixels 422 are positioned such that the pattern reconstruction system 102 detects at least 75% (or other threshold value) of the maximum expected collinear samples. Alternatively, in response to determining that the collinear pixels 422 are not positioned at the corresponding intervals (e.g., the pattern reconstruction system 102 does not detect at least 75% of the maximum expected collinear samples), the pattern reconstruction system 102 determines that the proposed pattern cell based on the pivot pixel fails.

Figure 4C:
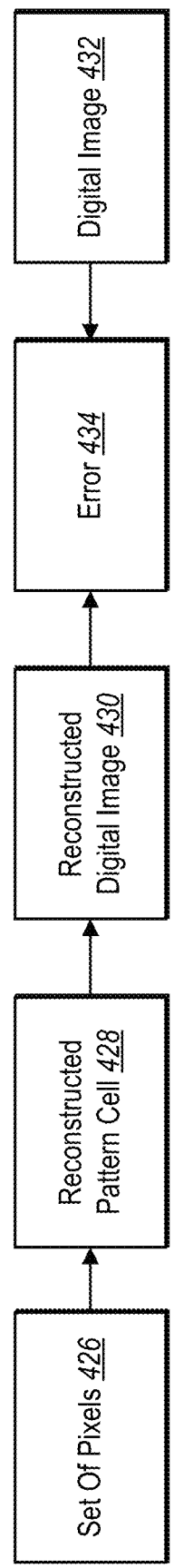

In one or more additional embodiments, as illustrated in FIG. 4C, the pattern reconstruction system 102 determines whether a set of pixels 426 corresponding to a particular pivot pixel results in a valid pattern cell for a digital image (e.g., in a proposal evaluation process). Specifically, the pattern reconstruction system 102 determines whether a reconstructed pattern cell 428 based on the set of pixels 426 results in a valid pattern configuration including a plurality of instances of the reconstructed pattern cell 428. For example, the pattern reconstruction system 102 generates a reconstructed digital image 430 including a pattern configuration based on the reconstructed pattern cell 428 accurately reconstructs a digital image 432.

To illustrate, the pattern reconstruction system 102 determines a start location (e.g., a location of the pivot pixel), an x-step (e.g., the first distance as described above with respect to a row of the pivot pixel), and a y-step (e.g., the second distance as described above with respect to a column of the pivot pixel). The pattern reconstruction system 102 generates the reconstructed digital image 430 by utilizing the start location, the x-step, and the y-step to generate a plurality of repeated instances of the reconstructed pattern cell 428 within a resolution of the digital image 432. Additionally, the pattern reconstruction system 102 determines an error 434 associated with the reconstructed digital image 430 by determining a difference between the reconstructed digital image 430 and the digital image 432. For instance, the pattern reconstruction system 102 generates the error 434 by determining a root mean square error ("RMSE") between the digital image 432 and the reconstructed digital image 430, which determines the average mismatch in each reconstructed pixel as compared to the corresponding original pixel and provides an accurate measurement of error between the digital image 432 and the reconstructed digital image 430. In alternative embodiments, the pattern reconstruction system 102 generates the error 434 by determining a structural similarity index measure between the digital image 432 and the reconstructed digital image 430, which determines an error in perception between the reconstructed digital image 430 and the digital image 432 by incorporating perceived changes in structural information, contrast, and luminance.

In one or more embodiments, the pattern reconstruction system 102 generates errors based on a plurality of reconstructed digital images corresponding to a plurality of proposed pattern cells. For example, the pattern reconstruction system 102 generates reconstructed digital images for proposed pattern cells associated with a plurality of pivot pixels. The pattern reconstruction system 102 ranks the accuracy of the reconstructed digital images utilizing the corresponding errors. In at least some embodiments, the pattern reconstruction system 102 drops all proposals with reconstruction errors greater than a threshold (e.g., with RMSE greater than 5%). Additionally, in some embodiments, the pattern reconstruction system 102 selects a proposed pattern cell with the smallest RMSE to pass to the next phase for refinement of the proposed pattern cell.

Figure 5:
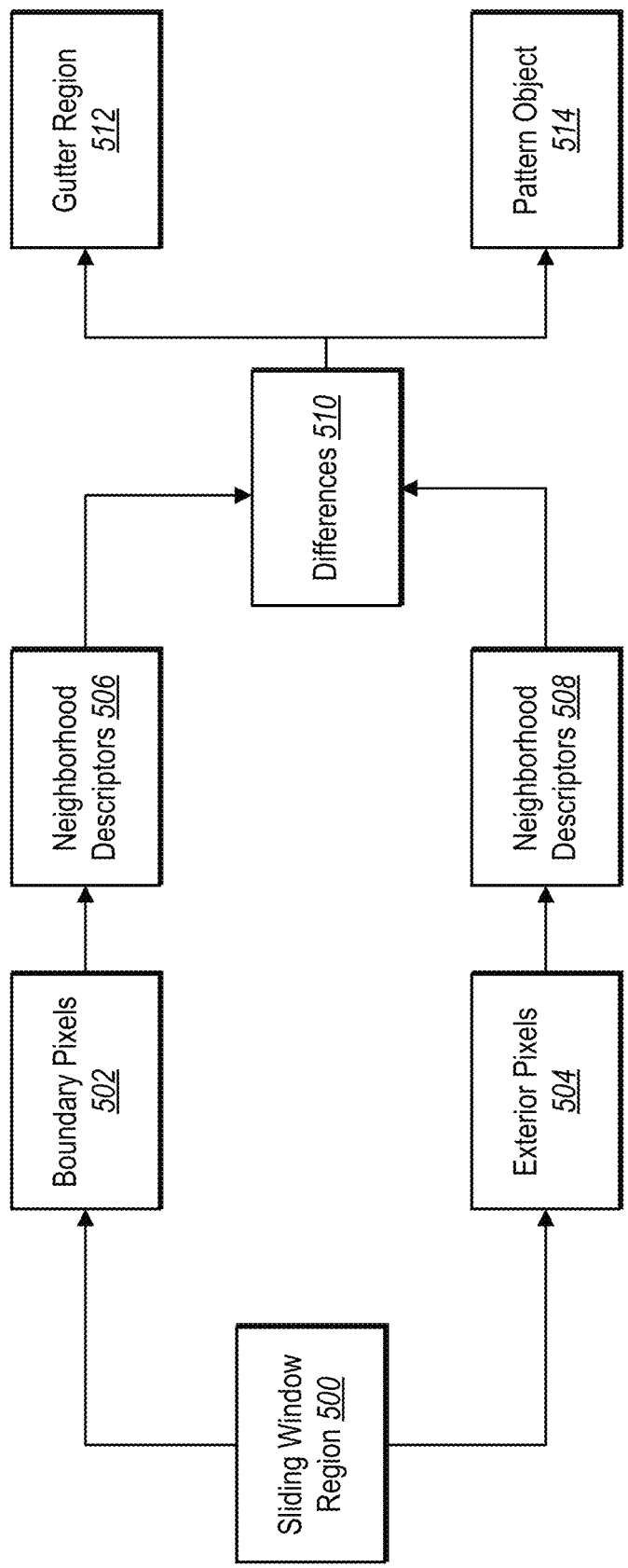
FIG. 5 illustrates a diagram of the pattern reconstruction system refining a pattern cell detected in a digital image in accordance with one or more implementations.

In one or more embodiments, the pattern reconstruction system 102 refines a proposed pattern cell for human perception. FIG. 5 illustrates the pattern reconstruction system 102 utilizing a sliding window process to move a pattern cell within a range of positions to identify a human-perceived pattern object. More specifically, FIG. 5 illustrates that the pattern reconstruction system 102 modifies a boundary of a pattern cell to focus on a human-perceived pattern object by analyzing pixels at the boundary and repositioning the pattern cell at the edges of the human-perceived pattern object.

As illustrated in FIG. 5, the pattern reconstruction system 102 determines a sliding window region 500 for a proposed pattern cell. Specifically, the pattern reconstruction system 102 determines the sliding window region 500 for testing a sliding window corresponding to the pattern cell based on the size of the pattern cell. To illustrate, the pattern reconstruction system 102 determines a width W and a height H of the pattern cell. Additionally, the pattern reconstruction system 102 determines the sliding window region 500 including a maximum search area as W-1 adjacent pixels in width and H-1 adjacent pixels in height.

According to one or more embodiments, the pattern reconstruction system 102 moves the sliding window by one pixel (horizontally or vertically) at a time and testing a plurality of pixels in the search area as a possible starting location for the pattern cell. Additionally, at each test location, the pattern reconstruction system 102 measures how much of the pattern cell boundary lies in the background of the digital image. For example, the pattern reconstruction system 102 determines boundary pixels 502 within the boundary of the pattern cell and exterior pixels 504 adjacent to the boundary pixels 502 outside the boundary of the pattern cell.

Furthermore, the pattern reconstruction system 102 compares the boundary pixels 502 to the exterior pixels 504. For example, the pattern reconstruction system 102 generates neighborhood descriptors 506 for the boundary pixels 502 and neighborhood descriptors 508 for the exterior pixels 504. According to one or more embodiments, the pattern reconstruction system 102 generates new neighborhood descriptors of a smaller size than the neighborhood descriptors in the proposal generation step. To illustrate, the pattern reconstruction system 102 generates neighborhood descriptors including a 3×3 pixel size centered at the corresponding pixels.

In one or more embodiments, the pattern reconstruction system 102 determines differences 510 between the boundary pixels 502 and the exterior pixels 504. In particular, the pattern reconstruction system 102 compares a neighborhood descriptor of a boundary pixel to a neighborhood descriptor of an adjacent exterior pixel outside the boundary of the sliding window. Additionally, in one or more embodiments, the pattern reconstruction system 102 determines an average difference of the boundary pixels 502 for a particular sliding window in comparison to the exterior pixels 504. The pattern reconstruction system 102 utilizes the average difference to generate a score (e.g., equal to the average difference) representing an amount of the boundary lying inside the background of the digital image. For example, if a boundary pixel and an adjacent exterior pixel are lying in the background, the corresponding neighborhood descriptors are similar.

According to one or more embodiments, the pattern reconstruction system 102 utilizes the sliding window to keep track a contiguous range of locations (horizontally and vertically) that correspond to the background. In response to determining a contiguous region that corresponds to the background, the pattern reconstruction system 102 determines a gutter region 512 around a pattern object 514. Specifically, in response to determining the gutter region 512, the pattern reconstruction system 102 determines that a pattern object 514 of the pattern cell is not tightly packed (e.g., pattern objects with visual spacing between the pattern objects or sparsely spaced pattern objects). Alternatively, in response to detecting no gutter region, the pattern reconstruction system 102 determines that the pattern object 514 is tightly packed (e.g., closely positioned pattern objects with little or no space between pattern objects or with a continuous/touching set of pattern objects).

Furthermore, in response to determining the gutter region 512, the pattern reconstruction system 102 determines that the pattern cell may have additional space to allow for shrinking the pattern cell. In one or more embodiments, in response to determining that the pattern cell includes a gutter region, the pattern reconstruction system 102 shrinks the boundary of the pattern cell to fit around the pattern object 514 at a position based on the sliding window. Additionally, in one or more embodiments, in response to shrinking the boundary of the pattern cell, the pattern reconstruction system 102 increases a horizontal and/or vertical gap between successive pattern cell instances based on the amount the pattern reconstruction system 102 shrunk the boundary of the pattern cell.

In addition, the pattern reconstruction system 102 determines a position of the pattern cell according to the sliding window and/or the gutter region 512. In particular, the pattern reconstruction system 102 determines that the left and top inner ends of the gutter region (towards the pattern cell) correspond to a beginning position of the pattern cell to include the pattern object 514. For example, the pattern reconstruction system 102 determines the beginning of the pattern object 514 (e.g., according to human perception) based on the position of the gutter region 512 relative to foreground pixels (e.g., based on visual gaps in the placement of different instances of pattern object). In one or more embodiments, a human-perceived pattern object corresponds to a repeating group of pixels in a rectangular grid pattern that humans perceive as being a single object or single instance of the repeating portion of the pattern.

In one or more embodiments, in response to detecting a pattern with tightly packed pattern objects, the pattern reconstruction system 102 determines an instance where a human-perceived pattern object ends and another begins. To illustrate, the pattern reconstruction system 102 utilizes the sliding window process (e.g., a sliding window process) to optimize for the sharpest change around the boundary of a pattern cell. For example, the pattern reconstruction system 102 compares neighborhood descriptors of the boundary pixels 502 and the exterior pixels 504 and accumulates the overall variance across the boundary of the pattern cell. Specifically, the pattern reconstruction system 102 determines that the highest variance between boundary and exterior pixels corresponds to the position of the pattern cell according to human perception.

Figure 6:
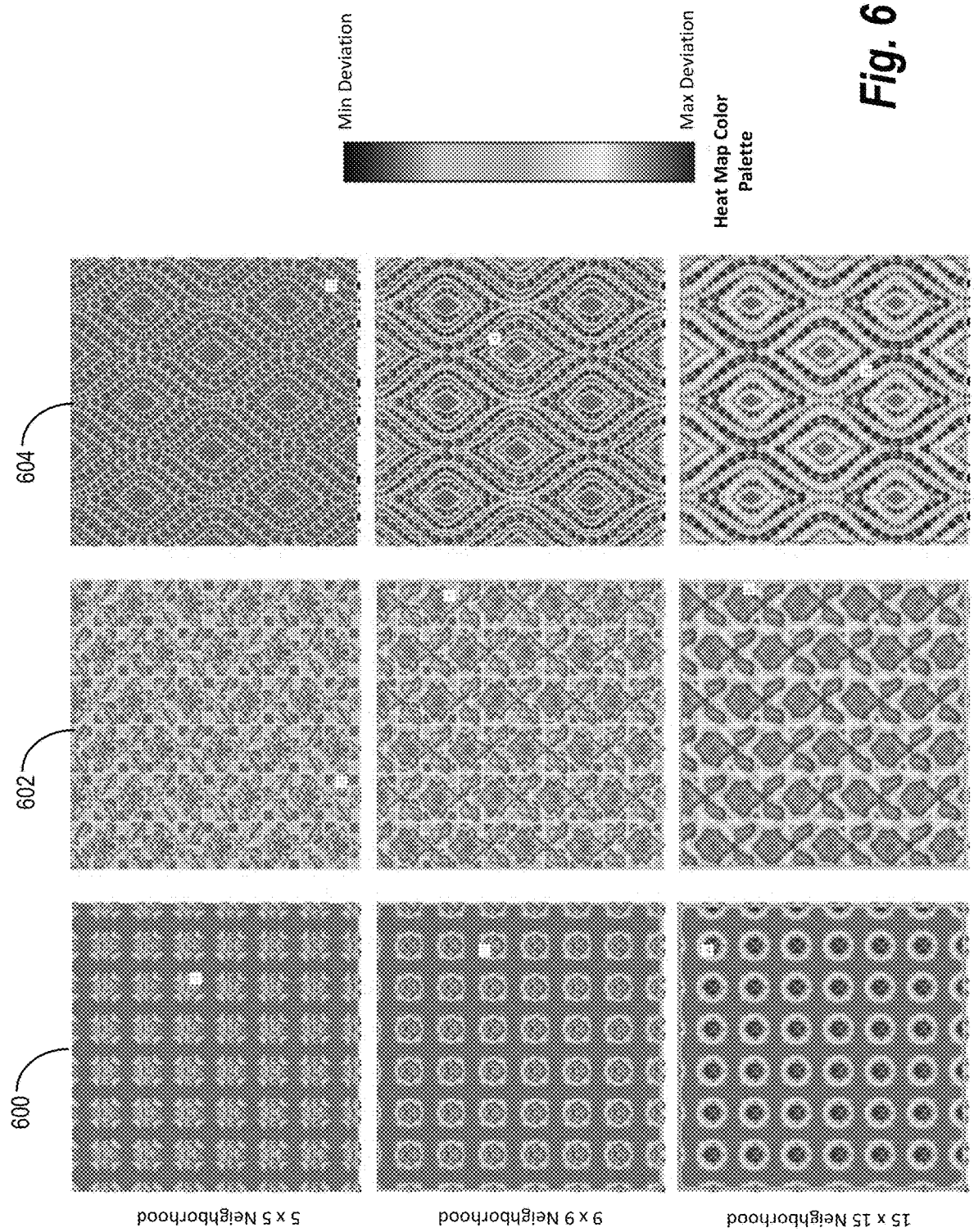
FIG. 6 illustrates a diagram of a heat map of variance of pixel structures from a neighborhood descriptor of a pivot pixel in accordance with one or more implementations.

As previously mentioned, the pattern reconstruction system 102 generates neighborhood descriptors for pixels of a digital image for identifying similar pixels in the digital image. FIG. 6 illustrates a plurality of heat maps of similar pixels to a pivot pixel based on comparisons of corresponding neighborhood descriptors as a delta variation from the pivot pixel. Specifically, FIG. 6 illustrates delta heat maps for a plurality of different images including different patterns (e.g., a first pattern 600, a second pattern 602, and a third pattern 604). Accordingly, the delta maps indicate how close each pixel in each image is relative to a corresponding pivot pixel. Furthermore, FIG. 6 illustrates a plurality of different delta heat maps for neighborhood descriptors of different sizes (e.g., 5×5, 9×9, and 15×15 pixel regions). As shown, specific sizes of neighborhood regions may be better for different types of patterns.

Figure 7A:
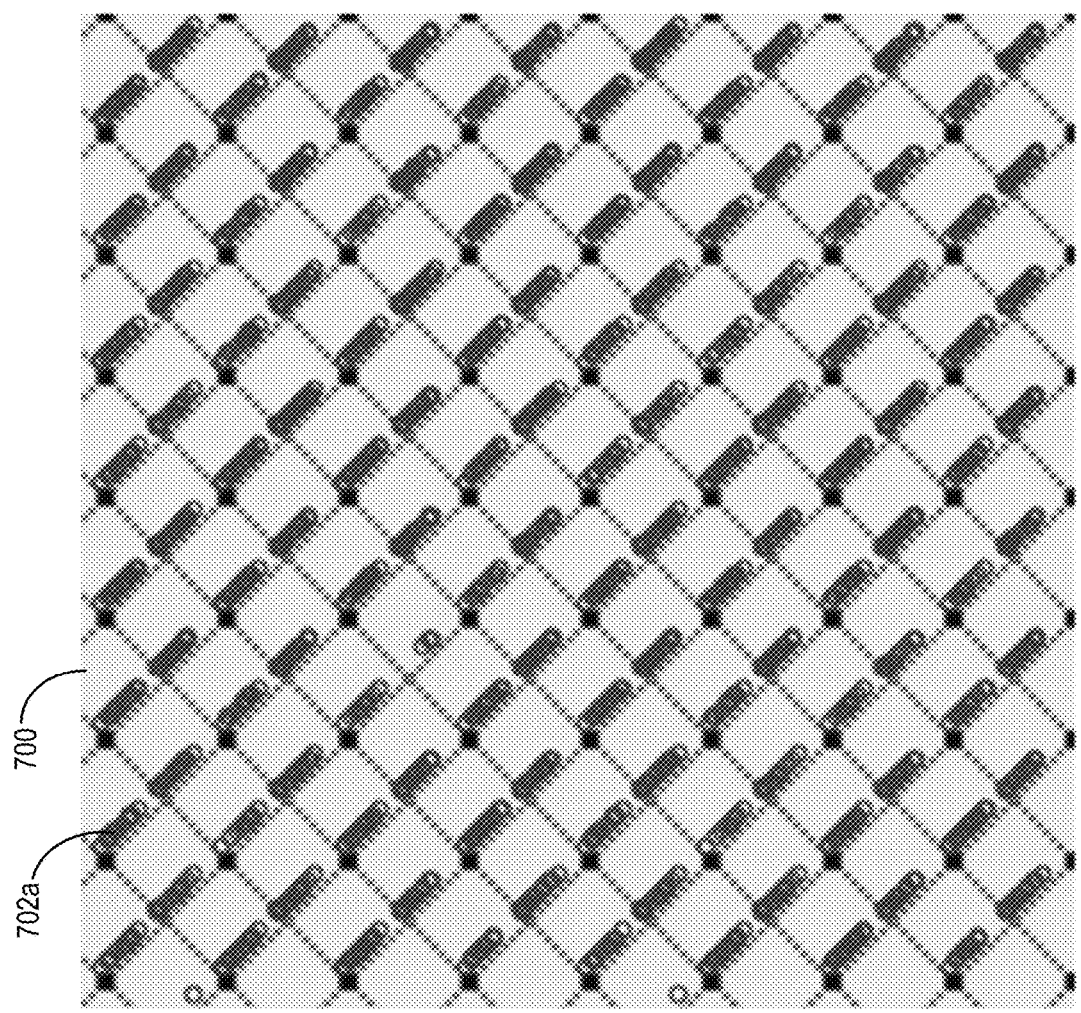
FIGS. 7A-7C illustrate a process in a process of determining a set of collinear, structurally similar pixels of a digital image in accordance with one or more implementations.
Figure 7B:
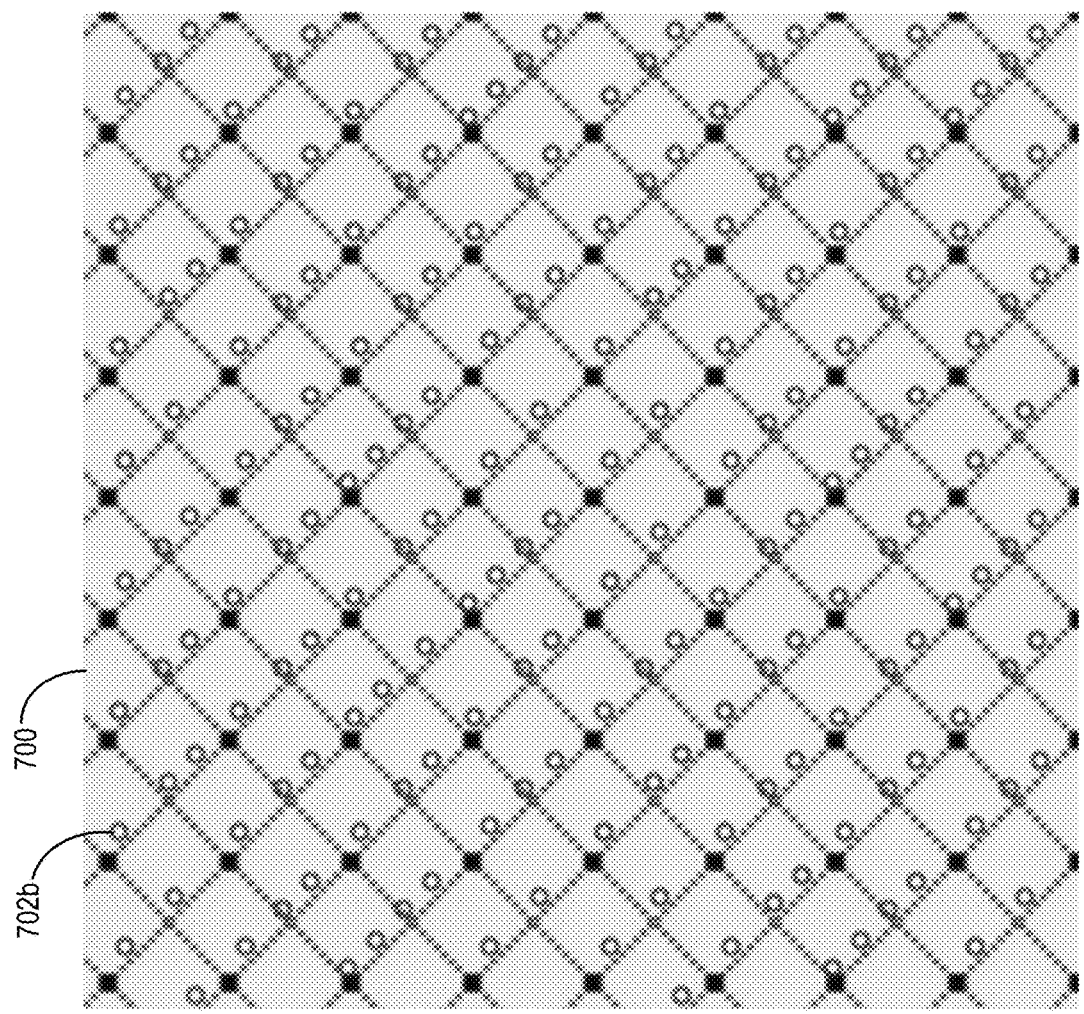
Figure 7C:
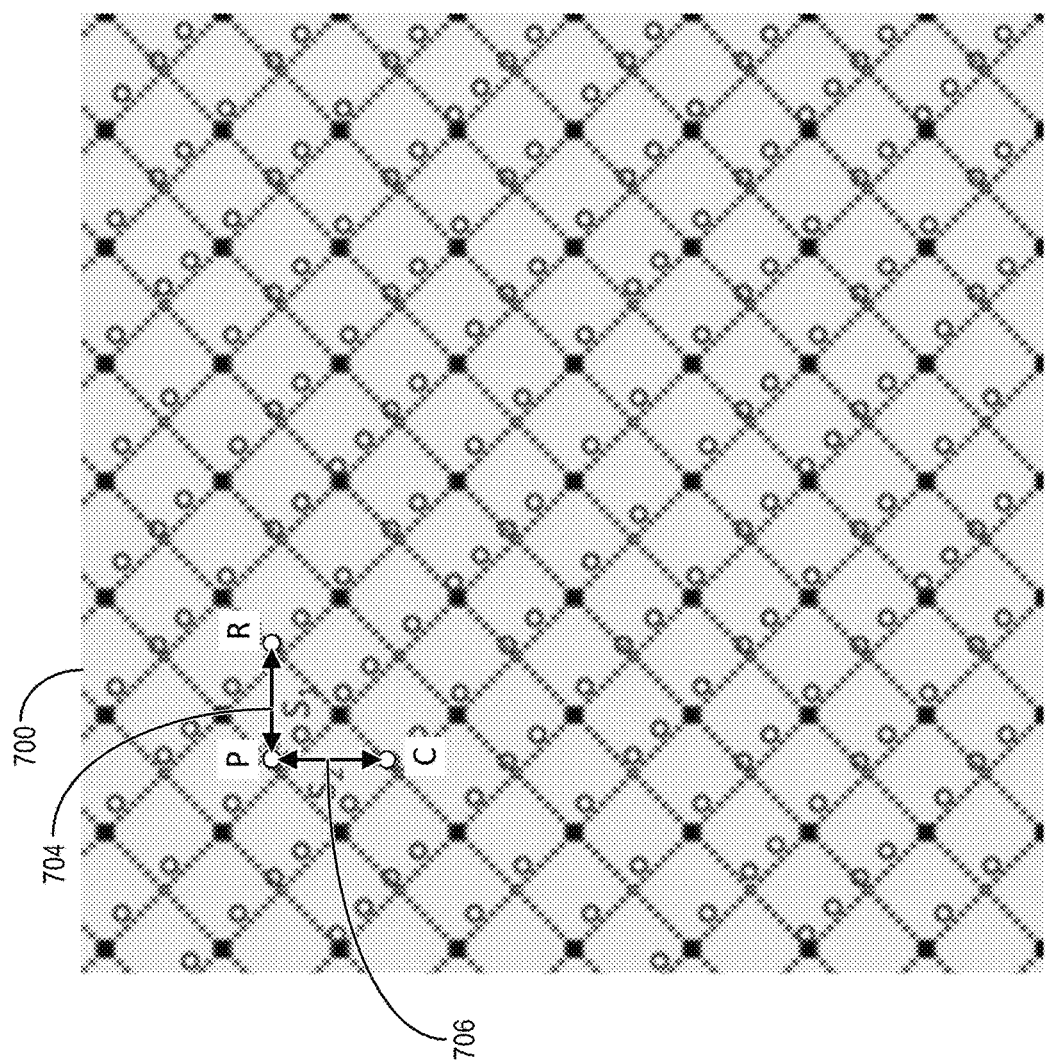

FIGS. 7A-7C illustrate digital images including highlighted pixels in connection with a proposal generation and evaluation process for determining pattern cells in a digital image. For example, FIG. 7A illustrates a digital image 700 including a specific pattern including a plurality of pattern objects (e.g., diamond shapes with dark squares at certain corners of the diamond shapes) repeating in a rectangular grid pattern. Additionally, FIG. 7A illustrates an initial set of pixels 702a identified by comparing neighborhood descriptions of a sampled set of pivot pixels in the digital image 700. For example, the pattern reconstruction system 102 detects that pixels near a lower left boundary of each diamond shape have similar neighborhood descriptors.

FIG. 7B illustrates that the pattern reconstruction system 102 refines the set of pixels with similar structural information for the digital image 700. Specifically, FIG. 7B illustrates that the pattern reconstruction system 102 determines a reduced set of pixels 702b by utilizing non-maximum suppression to eliminate similar pixels with overlapping neighborhood descriptors. Furthermore, the pattern reconstruction system 102 determines the reduced set of pixels 702b by restricting the similar pixels to collinear pixels in the digital image 700. Thus, the pattern reconstruction system 102 significantly reduces the number of pixels from the set of pixels 702a of FIG. 7A to determine the reduced set of pixels 702b of FIG. 7B to identify the pixels most likely to form a pattern cell.

FIG. 7C illustrates the digital image 700 including an overlaid indication of a set of pixels that form a pattern cell. In particular, FIG. 7C illustrates a pivot pixel ("P"), a first closest pixel ("R") in a row of the pivot pixel, and a second closest pixel ("C") in a column of the pivot pixel. Accordingly, the pattern reconstruction system 102 determines a set of 3 pixels that form a rectangular pattern cell that, when replicated across the digital image, form a rectangular grid pattern. For instance, the pattern reconstruction system 102 determines the pattern cell based on a first distance 704 between the pivot pixel and the first closest pixel and a second distance 706 between the pivot pixel and the second closest pixel. As illustrated, the pattern reconstruction system 102 determines that the pattern cell is valid in response to determining that the pattern reconstruction system 102 is able to replicate the pattern cell across the digital image 700 at a plurality of different intervals based on the first distance 704 and the second distance 706.

Figure 8:
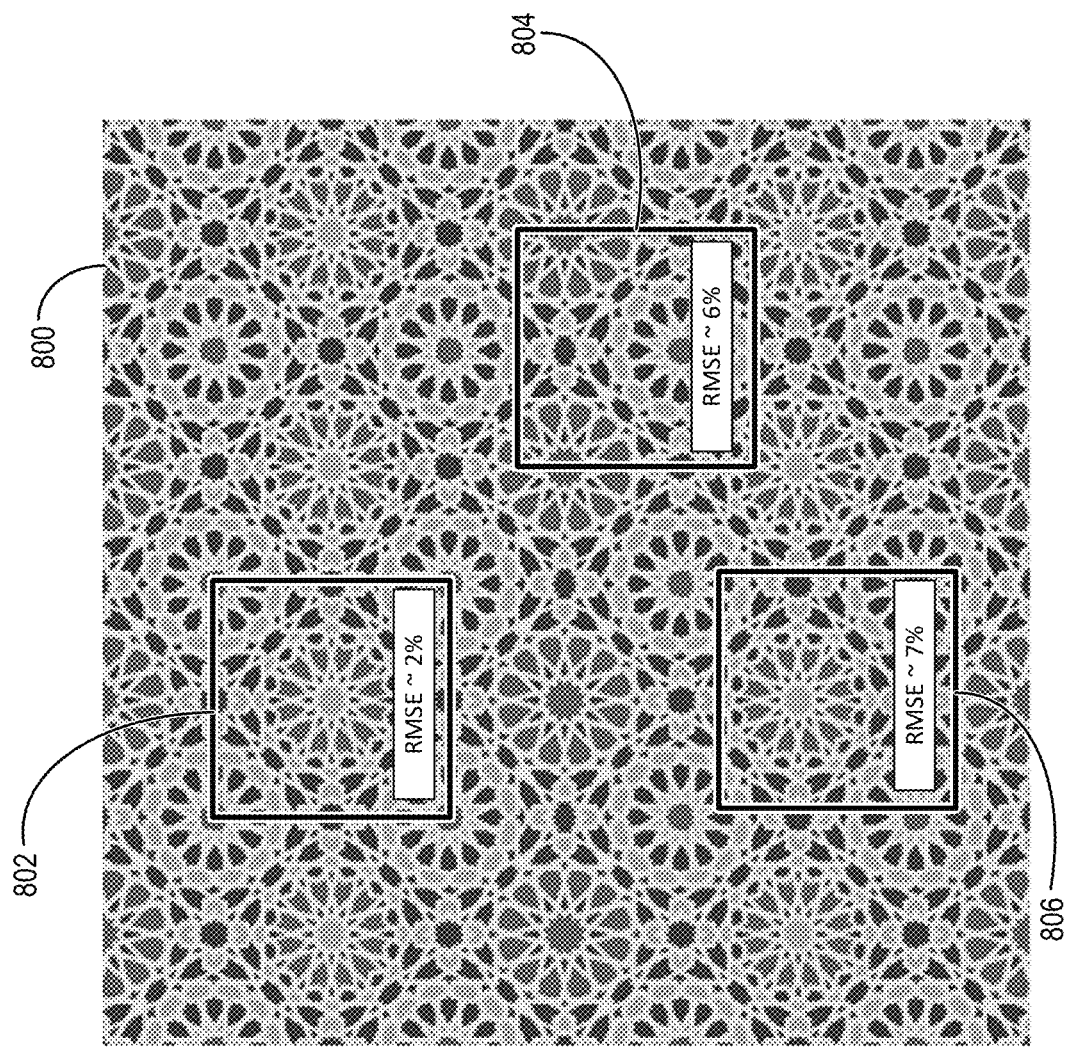
FIG. 8 illustrates a digital image including pattern cell proposals generated by the pattern reconstruction system in accordance with one or more implementations.

As mentioned, in one or more embodiments, the pattern reconstruction system 102 evaluates a pattern cell proposal based on how accurately the pattern cell proposal replicates a digital image. For example, FIG. 8 illustrates a digital image 800 including a rectangular grid pattern. Furthermore FIG. 8 illustrates that the pattern reconstruction system 102 determines a plurality of different pattern cell proposals (e.g., a first pattern cell proposal 802, a second pattern cell proposal 804, and a third pattern cell proposal 806). Additionally, FIG. 8 illustrates error values based on reconstructed digital images generated according to the different pattern cell proposals. More specifically, the first pattern cell proposal 802 corresponds to a RMSE of ~2%, the second pattern cell proposal 804 corresponds to a RMSE of ~6%, and a third pattern cell proposal 806 corresponds to a RMSE of ~7%. Thus, the pattern reconstruction system 102 selects the first pattern cell proposal 802 in response to the first pattern cell proposal having the lowest error.

Figure 9A:
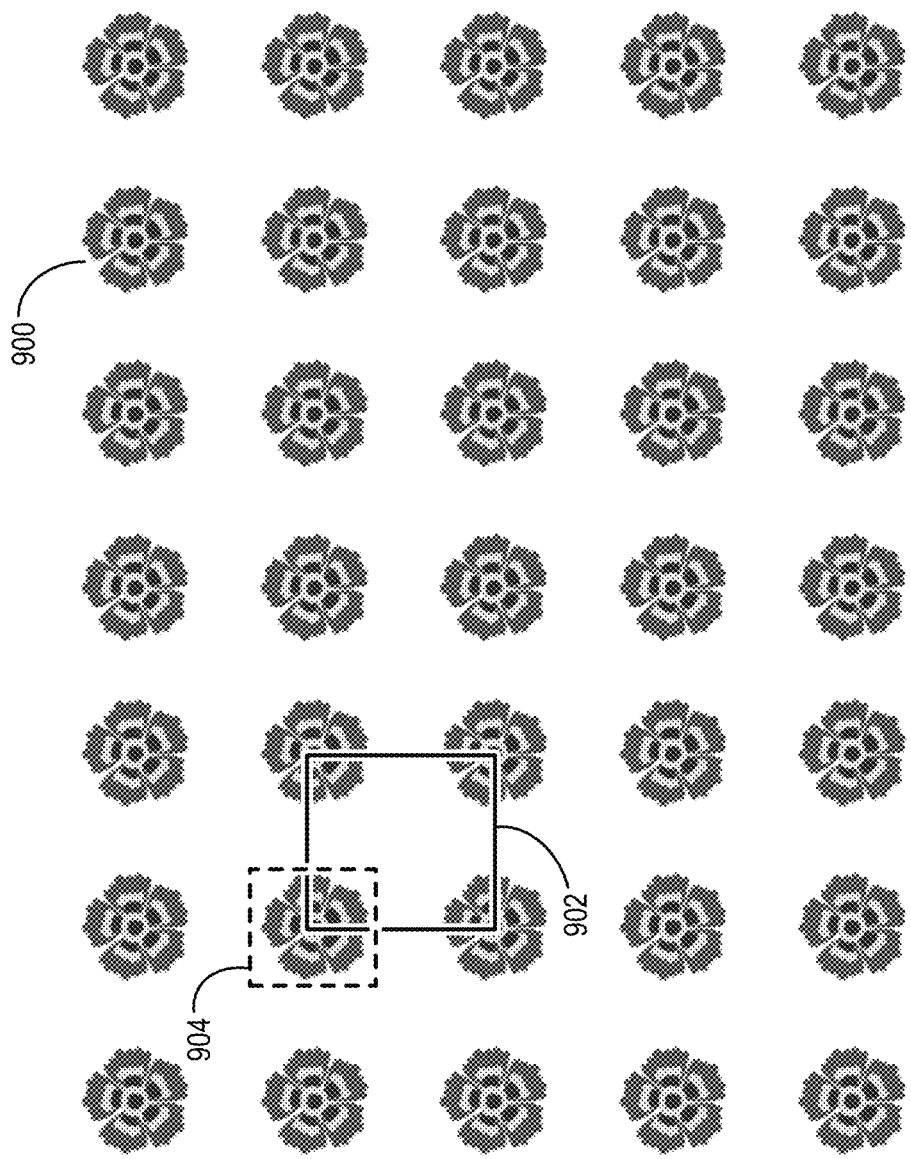
FIGS. 9A-9B illustrate digital images in a process for utilizing a sliding window to modify a boundary of a pattern cell in accordance with one or more implementations.

In one or more embodiments, the pattern reconstruction system 102 refines a pattern cell in response to determining a valid pattern cell. For example, FIG. 9A illustrates that the pattern reconstruction system 102 determines a digital image 900 including a rectangular grid pattern of a plurality of pattern objects. The pattern reconstruction system 102 refines a pattern cell 902 determined based on similar pixels in the digital image 900. Specifically, the pattern reconstruction system 102 modifies a boundary of the pattern cell 902 to generate a refined pattern cell 904 by centering the boundary on a pattern object and shrinking the boundary around the pattern object.

Figure 9B:
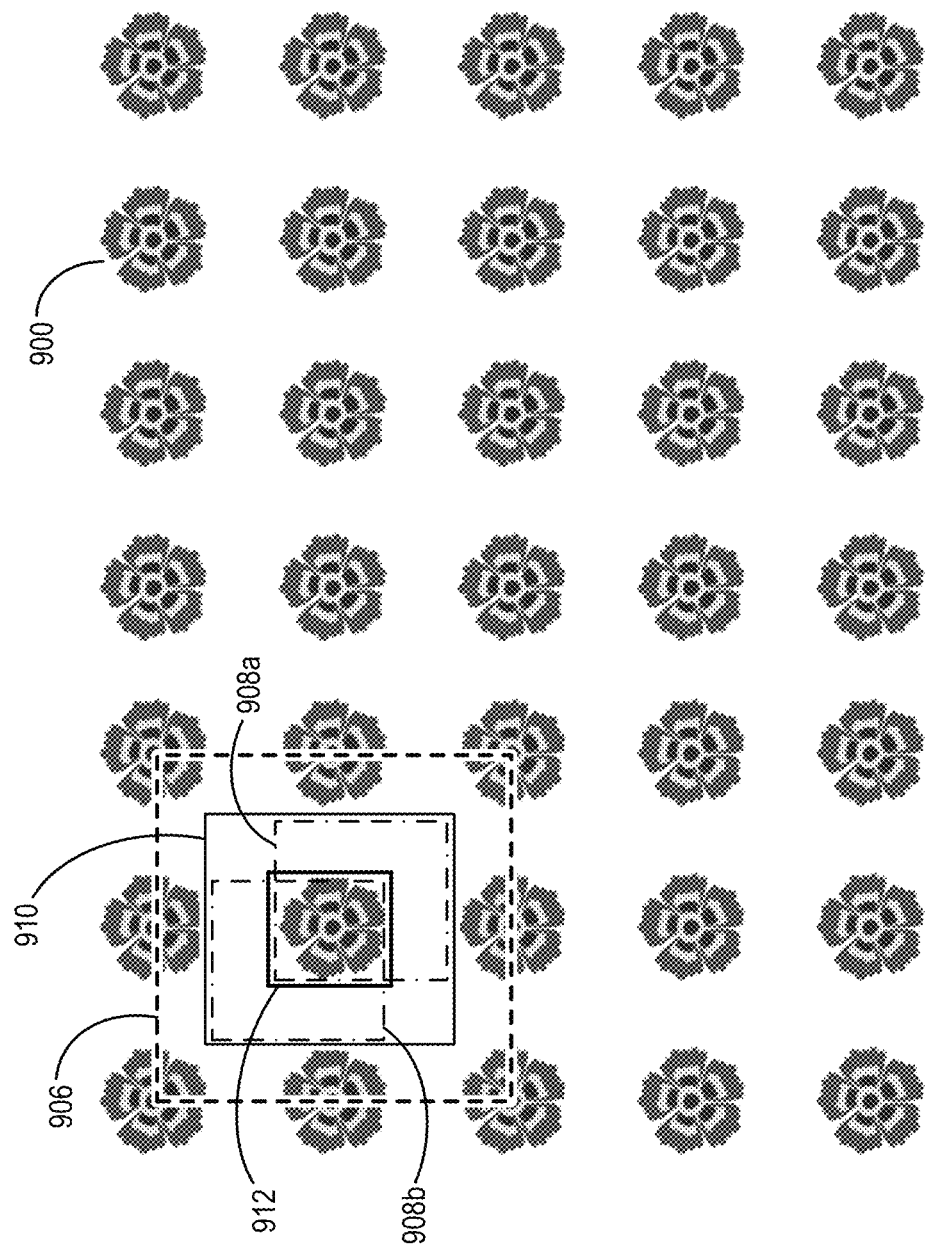

According to one or more embodiments, FIG. 9B illustrates the pattern reconstruction system 102 utilizing a sliding window process to refine a boundary of a pattern cell for the digital image 900. In particular, as previously mentioned, the pattern reconstruction system 102 determines a sliding window region 906 indicating a test region for a sliding window. Additionally, FIG. 9B illustrates that the pattern reconstruction system 102 moves a boundary of the pattern cell within the test region to a plurality of different positions (e.g., a first position 908a and a second position 908b) by adjusting the boundary one pixel at a time. The pattern reconstruction system 102 tests the pattern cell at each position by comparing boundary pixels within the pattern cell boundary to exterior pixels outside the pattern cell boundary and adjacent to the boundary pixels (e.g., via corresponding neighborhood descriptors).

FIG. 9B further illustrates a gutter region 910 including a contiguous region corresponding to the background of the digital image 900 within the sliding window region 906. In response to detecting the gutter region 910 of the digital image 900, the pattern reconstruction system 102 determines that a pattern object is not tightly packed. Furthermore, the pattern reconstruction system 102 utilizes the gutter region 910 to shrink a boundary of the pattern cell to determine a final pattern cell 912 centered on the pattern object and excluding the gutter region 910. In one or more embodiments, in response to shrinking the boundary of the pattern cell, the pattern reconstruction system 102 also increases distances between pattern cells in a reconstructed pattern based on the amount that the pattern reconstruction system 102 shrunk the boundary of the pattern cell (e.g., to maintain a similar distance between pattern objects).

Figure 10:
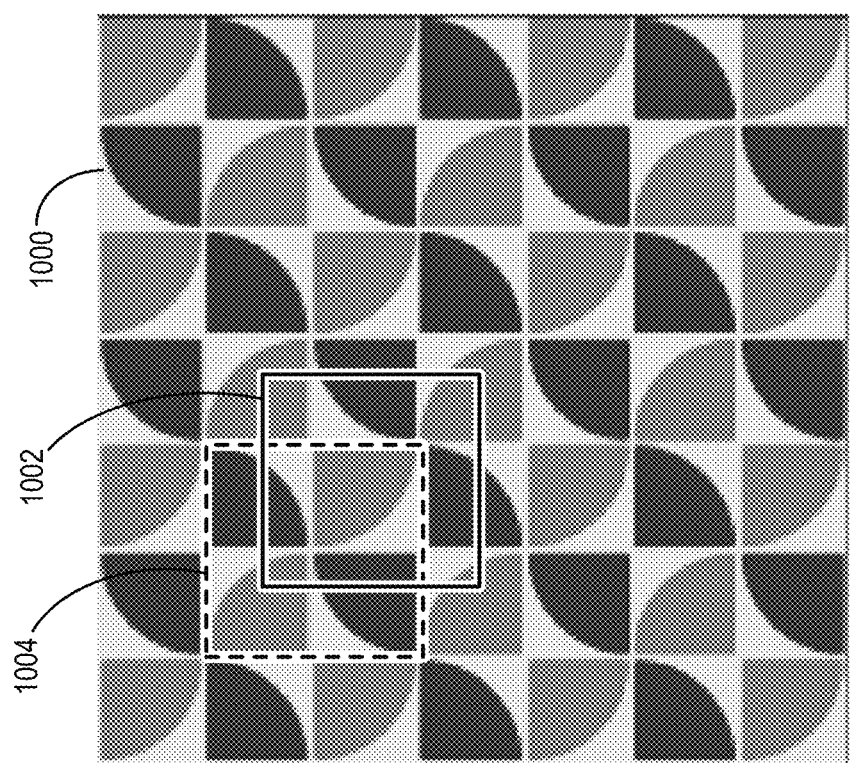
FIG. 10 illustrates a digital image in which the pattern reconstruction system modified an initial pattern cell to reconstruct a pattern object in accordance with one or more implementations.

As mentioned, the pattern reconstruction system 102 also modifies pattern cell boundaries in tightly packed patterns. For example, FIG. 10 illustrates a digital image 1000 including a rectangular pattern grid with tightly packed pattern objects. In one or more embodiments, in response to detecting the tightly packed pattern objects in the digital image 1000, the pattern reconstruction system 102 moves a pattern cell from a first position 1002 to a second position 1004 to determine a human-perceived pattern object for a reconstructed pattern based on the detected pattern cell.

In one or more embodiments, in response to reconstructing a pattern cell including a pattern object from a digital image including a rectangular grid pattern, the pattern reconstruction system 102 provides the pattern cell for a variety of different uses. For instance, the pattern reconstruction system 102 automatically generates a digital vector image including a rectangular grid pattern of vectors reproduced from a plurality of instances of the pattern cell. In some embodiments, the pattern reconstruction system 102 provides tools for modifying the pattern within the digital vector image, such as for dynamically increasing or decreasing a size of the pattern (e.g., without adding or removing full or partial instances of the pattern cell horizontally and/or vertically). To illustrate, in response to a request to modify a boundary of a pattern inserted into a digital vector image, the pattern reconstruction system 102 changes a boundary of the pattern without stretching or shrinking the pattern objects within the pattern.

Furthermore, the pattern reconstruction system 102 provides tools to modify characteristics of the pattern in a digital vector image. Specifically, the pattern reconstruction system 102 provides tools to modify colors of one or more portions of the pattern. For example, in response to a selection to modify a color of a particular portion of a pattern object, the pattern reconstruction system 102 modifies the color of the portion of the pattern object within each instance of the pattern across the digital image. In alternative embodiments, the pattern reconstruction system 102 modifies a color of a portion of a pattern object in a single instance of the pattern object. Furthermore, the pattern reconstruction system 102 performs additional modifications to the pattern and/or pattern objects, such as by hiding a portion of the pattern object, inserting a plurality of separately modifiable patterns (e.g., separate pattern swatches) including the same pattern objects, rotating the pattern, or other modifications.

In additional embodiments, the pattern reconstruction system 102 generates a digital library asset accessible within one or more digital image editing applications. For example, the pattern reconstruction system 102 provides tools to insert one or more instances of the pattern object into a digital image according to the stored digital library asset. To illustrate, the pattern reconstruction system 102 inserts one or more instances of a pattern object of the stored digital library asset into a digital vector image or a digital raster image. In one or more embodiments, the pattern reconstruction system 102 also provides tools for modifying the pattern object inserted from the digital library asset into a digital image and/or for modifying the digital library asset as stored.

Figure 11:
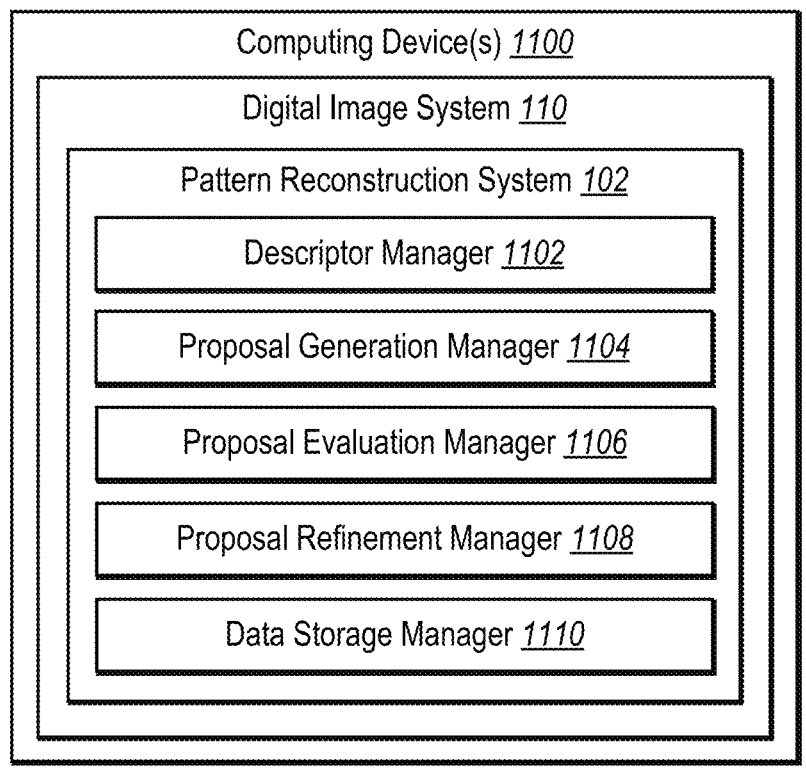
FIG. 11 illustrates a diagram of the pattern reconstruction system of FIG. 1 in accordance with one or more implementations.

FIG. 11 illustrates a detailed schematic diagram of an embodiment of the pattern reconstruction system 102 described above. As shown, the pattern reconstruction system 102 is implemented in a digital image system 110 on computing device(s) 1100 (e.g., a client device and/or server device as described in FIG. 1, and as further described below in relation to FIG. 13). Additionally, the pattern reconstruction system 102 includes, but is not limited to, a descriptor manager 1102, a proposal generation manager 1104, a proposal evaluation manager 1106, a proposal refinement manager 1108, and a data storage manager 1110. The pattern reconstruction system 102 can be implemented on any number of computing devices. For example, the pattern reconstruction system 102 can be implemented in a distributed system of server devices for digital content editing tasks. The pattern reconstruction system 102 can also be implemented within one or more additional systems. Alternatively, the pattern reconstruction system 102 can be implemented on a single computing device such as a single client device.

In one or more embodiments, each of the components of the pattern reconstruction system 102 is in communication with other components using any suitable communication technologies. Additionally, the components of the pattern reconstruction system 102 are capable of being in communication with one or more other devices including other computing devices of a user, server devices (e.g., cloud storage devices), licensing servers, or other devices/systems. It will be recognized that although the components of the pattern reconstruction system 102 are shown to be separate in FIG. 11, any of the subcomponents may be combined into fewer components, such as into a single component, or divided into more components as may serve a particular implementation. Furthermore, although the components of FIG. 11 are described in connection with the pattern reconstruction system 102, at least some of the components for performing operations in conjunction with the pattern reconstruction system 102 described herein may be implemented on other devices within the environment.

In some embodiments, the components of the pattern reconstruction system 102 include software, hardware, or both. For example, the components of the pattern reconstruction system 102 include one or more instructions stored on a computer-readable storage medium and executable by processors of one or more computing devices (e.g., the computing device(s) 1100). When executed by the one or more processors, the computer-executable instructions of the pattern reconstruction system 102 cause the computing device(s) 1100 to perform the operations described herein. Alternatively, the components of the pattern reconstruction system 102 include hardware, such as a special purpose processing device to perform a certain function or group of functions. Additionally, or alternatively, the components of the pattern reconstruction system 102 include a combination of computer-executable instructions and hardware.

Furthermore, the components of the pattern reconstruction system 102 performing the functions described herein with respect to the pattern reconstruction system 102 may, for example, be implemented as part of a stand-alone application, as a module of an application, as a plug-in for applications, as a library function or functions that may be called by other applications, and/or as a cloud-computing model. Thus, the components of the pattern reconstruction system 102 may be implemented as part of a stand-alone application on a personal computing device or a mobile device. Alternatively, or additionally, the components of the pattern reconstruction system 102 may be implemented in any application that provides digital image modification, including, but not limited to ADOBE® ILLUSTRATOR®, ADOBE® PHOTOSHOP®, and ADOBE® CREATIVE CLOUD®.

The pattern reconstruction system 102 includes a descriptor manager 1102 to generate and store regional structural information for pixels in a digital image. For example, the descriptor manager 1102 generates neighborhood descriptors including pixel values of pixels within local neighborhoods of the pixels in the digital image. Additionally, the descriptor manager 1102 generates neighborhood descriptors of various sizes for the pixels in the digital image according to various digital image characteristics or preferences.

The pattern reconstruction system 102 includes a proposal generation manager 1104 to generate a plurality of proposals of pattern cells from a digital image. In one or more embodiments, the proposal generation manager 1104 detects pixels with similar structural information based on neighborhood descriptors generates by the descriptor manager 1102. Additionally, the pattern reconstruction system 102 determines candidate pattern cells based on collinear pixels with similar structural information. In some embodiments, the pattern reconstruction system 102 utilizes a non-maximum suppression model to determine candidate pattern cells.

The pattern reconstruction system 102 further includes a proposal evaluation manager 1106 to evaluate the validity of candidate pattern cells. For instance, the proposal evaluation manager 1106 generates reconstructed digital images including a plurality of instances of candidate pattern cells. The proposal evaluation manager 1106 also generates errors by comparing differences between the reconstructed digital images and a digital image to determine a candidate cell with the lowest error.

The pattern reconstruction system 102 also includes a proposal refinement manager 1108 to refine boundaries of pattern cells. Specifically, the proposal refinement manager 1108 utilizes a sliding window process to center pattern cell boundaries on human-perceived pattern objects. For example, the proposal refinement manager 1108 determines whether a pattern includes sparse or tightly packed pattern objects utilizing the sliding window process. Additionally, the proposal refinement manager 1108 generates a final boundary of a pattern cell based on a gutter region and/or a human-perceived pattern object.

The pattern reconstruction system 102 also includes a data storage manager 1110 (that comprises a non-transitory computer memory/one or more memory devices) that stores and maintains data associated with detecting patterns in digital images. For example, the data storage manager 1110 stores data associated with pattern cells and pattern objects. To illustrate, the data storage manager 1110 stores digital images, neighborhood descriptors of pixels, samples pixels, candidate pattern cells, and finalized pattern cells. Furthermore, the data storage manager 1110 stores reconstructed digital images, reconstructed patterns, or digital library assets including pattern objects.

Figure 12:
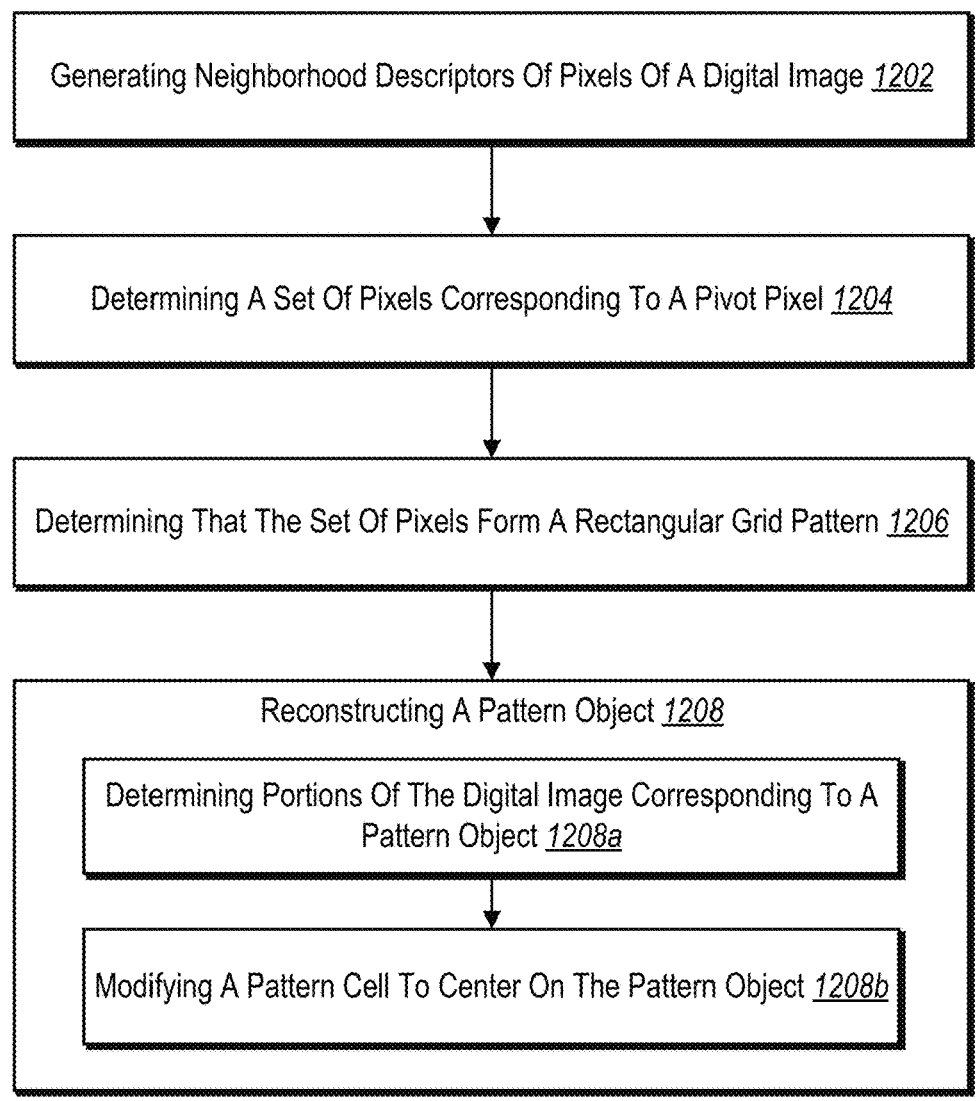
FIG. 12 illustrates a flowchart of a series of acts for detecting and reconstructing a pattern of a digital image in accordance with one or more implementations.

Turning now to FIG. 12, this figure shows a flowchart of a series of acts 1200 of detecting and reconstructing a pattern of a digital image. While FIG. 12 illustrates acts according to one embodiment, alternative embodiments may omit, add to, reorder, and/or modify any of the acts shown in FIG. 12. The acts of FIG. 12 are part of a method. Alternatively, a non-transitory computer readable medium comprises instructions, that when executed by one or more processors, cause the one or more processors to perform the acts of FIG. 12. In still further embodiments, a system includes a processor or server configured to perform the acts of FIG. 12.

As shown, the series of acts 1200 includes an act 1202 of generating neighborhood descriptors of pixels of a digital image. For example, act 1202 involves generating, for pixels of a digital image, neighborhood descriptors comprising pixel values within neighborhoods of the pixels of the digital image. Act 1202 involves generating, for a particular pixel of the digital image, a neighborhood descriptor comprising a vector of a plurality of pixel values of pixels within one or more predetermined distances of the particular pixel. Act 1202 involves generating a first neighborhood descriptor based on pixels in a first predetermined neighborhood of a first pixel of the digital image.

The series of acts 1200 also includes an act 1204 of determining a set of pixels corresponding to a pivot pixel. For example, act 1204 involves determining, for a pivot pixel in the digital image, a set of pixels corresponding to neighborhood descriptors within a threshold of a neighborhood descriptor of the pivot pixel. Act 1204 involves determining that a second neighborhood descriptor corresponding to a second pixel of the digital image is within a threshold of the first neighborhood descriptor.

Act 1204 optionally involves determining an additional pixel corresponding to an additional neighborhood descriptor within the threshold of the neighborhood descriptor of the particular pixel. For example, act 1204 involves determining that pixels in a vector corresponding to the additional neighborhood descriptor are within a threshold value of corresponding pixels in a vector corresponding to the neighborhood descriptor of the particular pixel. Act 1204 optionally involves adding the additional pixel to the set of pixels in response to determining that the additional pixel is collinear with the particular pixel in a row of pixels of the digital image or in a column of pixels of the digital image.

Act 1204, in one or more implementations, involves comparing pixel values of the neighborhood descriptor of the pivot pixel to pixel values of the neighborhood descriptors of the set of pixels. Act 1204, in one or more implementations, further involves determining that at least one pixel of the set of pixels comprises a corresponding neighborhood descriptor with pixel values within the threshold of the pixel values of the neighborhood descriptor of the pivot pixel.

Additionally, act 1204, in one or more implementations, involves adding a particular pixel of the digital image to the set of pixels by utilizing a non-maximum suppression model to select the particular pixel according to a neighborhood descriptor of the particular pixel while excluding one or more additional pixels with corresponding neighborhood descriptors overlapping the neighborhood descriptor of the particular pixel. For example, act 1204 involves excluding, utilizing the non-maximum suppression model, the one or more additional pixels in response to determining that the one or more additional pixels are not collinear to the particular pixel.

Additionally, the series of acts 1200 includes an act 1206 of determining that the set of pixels form a rectangular grid pattern. For example, act 1206 involves determining that the set of pixels form a rectangular grid pattern comprising a pattern cell within the digital image.

Act 1206, in one or more implementations, involves determining a first distance from a first pixel of the set of pixels closest to the pivot pixel within a row of the digital image and determining a second distance from a second pixel of the set of pixels closest to the pivot pixel within a column of the digital image. Act 1206, in one or more implementations, involves determining that a first plurality of pixels collinear with the pivot pixel within the row of the digital image are positioned at intervals of first distance. Act 1206 further optionally involves determining that a second plurality of pixels collinear with the pivot pixel within the column of the digital image are positioned at intervals of the second distance. Act 1206 also, in one or more implementations, involves determining that the set of pixels forms the rectangular grid pattern.

As part of act 1202, act 1204, or act 1206, the series of acts 1200 includes generating a first set of neighborhood descriptors for the pixels of the digital image according to a first descriptor size. The series of acts 1200 optionally include determining that the first set of neighborhood descriptors do not result in a rectangular grid patter within the digital image. The series of acts 1200 further includes generating a second set of neighborhood descriptors for the pixels of the digital image according to a second descriptor size, in one or more implementations.

The series of acts 1200 includes an act 1208 of reconstructing a pattern object. For example, act 1208 involves determining the pattern object from the pattern cell in response to determining that a difference between the digital image and a reconstructed digital image comprising a plurality of repeating instances of the pattern cell is below an error threshold. Act 1208 optionally involves detecting background pixels of the pattern cell and object pixels of the pattern object by comparing boundary pixels of a sliding window corresponding to the pattern cell to adjacent pixels outside the sliding window. Act 1208, in one or more implementations, involves determining the pattern object according to a position of the sliding window relative to the pattern object and the detected background pixels of the pattern cell.

Act 1208 also includes an act 1208a of determining portions of the digital image corresponding to a pattern object. For example, act 1208a involves determining, utilizing a sliding window corresponding to the pattern cell, one or more portions of the pattern cell corresponding to a background of the digital image and one or more portions of the pattern cell corresponding to a pattern object.

For example, act 1208a involves determining a pixel difference by comparing a neighborhood descriptor of a boundary pixel at a boundary of the sliding window to a neighborhood descriptor of an adjacent pixel outside the boundary of the sliding window. Act 1208a, in one or more implementations, involves determining that the boundary pixel corresponds to the background or the pattern object based on the pixel difference. Act 1208a can involve determining a gutter region comprising a contiguous background region in response to determining the one or more portions of the pattern cell corresponding to the background of the digital image.

Act 1208 can further include an act 1208b of modifying a pattern cell to center on the pattern object. For example, act 1208b involves modifying a boundary of the pattern cell to center the pattern object within the pattern cell. Act 1208b optionally involves centering the pattern object within the pattern cell based on the gutter region.

According to the acts above, in one or more embodiments, the series of acts 1200 includes generating, for a pixel of a digital image, a neighborhood descriptor comprising pixel values within a neighborhood of the pixel. The series of acts 1200, in one or more implementations, includes determining, for the pixel in the digital image, a set of pixels within a column and a row of the pixel corresponding to neighborhood descriptors within a threshold of a neighborhood descriptor of the pixel. For example, the series of acts 1200 includes determining and initial set of pixels comprising pixels corresponding to neighborhood descriptors within the threshold of the neighborhood descriptor of the pixel. The series of acts 1200 optionally includes determining a subset of pixels of the initial set of pixels with overlapping descriptors. The series of acts 1200, in one or more implementations, includes determining the set of pixels based on the initial set of pixels excluding the subset of pixels.

The series of acts 1200 optionally include determining that the set of pixels form a rectangular grid pattern comprising a pattern cell within the digital image. For example, the series of acts 1200 includes determining, from the set of pixels, a first set of pixels collinear with the pixel within the row. Additionally, the series of acts 1200 includes determining, from the set of pixels, a second set of pixels collinear with the pixel within the column. The series of acts 1200 also includes determining that the pixel, the first set of pixels, and the second set of pixels form the rectangular grid pattern comprising the pattern cell within the digital image based on first distances between the pixel and the first set of pixels and second distances between the pixel and the second set of pixels.

In one or more implementations, the series of acts 1200 includes reconstructing a pattern object by modifying a boundary of the pattern cell. For example, the series of acts 1200 includes detecting, utilizing a sliding window corresponding to the pattern cell, a background portion, and a pattern object portion within the pattern cell. The series of acts 1200 also include modifying the boundary of the pattern cell to center the pattern object within the pattern cell according to the background portion and the pattern object portion detected within the pattern cell.

The series of acts 1200, in one or more implementations, includes generating a vector-based pattern cell comprising the pattern object in response to a request to vectorize the digital image, the digital image comprising a digital raster image. The series of acts 1200 also includes inserting, into a digital vector image, a modifiable pattern comprising one or more instances of the vector-based pattern cell.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
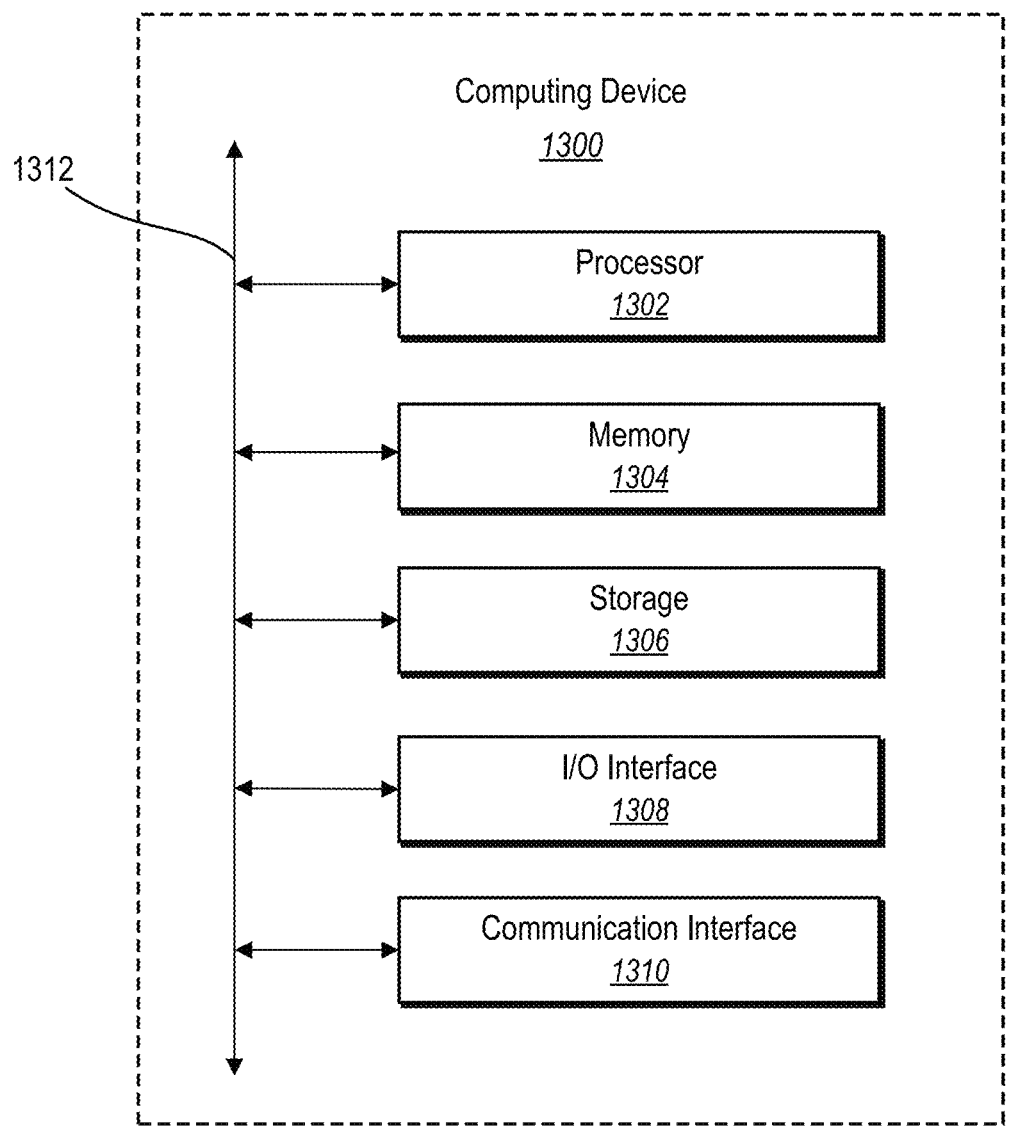
FIG. 13 illustrates a block diagram of an exemplary computing device in accordance with one or more embodiments.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   generating, for pixels of a digital image and in connection with reconstructing a pattern in the digital image, neighborhood descriptors comprising arrays of pixel values corresponding to pixels within neighborhoods of the pixels of the digital image;
   determining, for a pivot pixel in the digital image, a set of pixels corresponding to neighborhood descriptors within a threshold of a neighborhood descriptor of the pivot pixel;
   determining that the set of pixels form a rectangular grid pattern comprising a pattern cell within the digital image; and
   reconstructing, by at least one processor, a pattern object based on the pattern cell.

2. The method of claim 1, wherein:
   generating the neighborhood descriptors comprises generating a first neighborhood descriptor based on pixels in a first predetermined neighborhood of a first pixel of the digital image; and
   determining the set of pixels comprises determining that a second neighborhood descriptor corresponding to a second pixel of the digital image is within a threshold of the first neighborhood descriptor.

3. The method of claim 1, wherein generating the neighborhood descriptors comprises:
   generating a first set of neighborhood descriptors for the pixels of the digital image according to a first descriptor size;
   determining that the first set of neighborhood descriptors do not result in a rectangular grid patter within the digital image; and
   generating a second set of neighborhood descriptors for the pixels of the digital image according to a second descriptor size.

4. The method of claim 1, wherein determining the set of pixels comprises:
  comparing pixel values of the neighborhood descriptor of the pivot pixel to pixel values of the neighborhood descriptors of the set of pixels; and
  determining that at least one pixel of the set of pixels comprises a corresponding neighborhood descriptor with pixel values within the threshold of the pixel values of the neighborhood descriptor of the pivot pixel.

5. The method of claim 1, wherein determining the set of pixels comprises adding a particular pixel of the digital image to the set of pixels by utilizing a non-maximum suppression model to select the particular pixel according to a neighborhood descriptor of the particular pixel while excluding one or more additional pixels with corresponding neighborhood descriptors overlapping the neighborhood descriptor of the particular pixel.

6. The method of claim 5, wherein adding the particular pixel comprises excluding, utilizing the non-maximum suppression model, the one or more additional pixels in response to determining that the one or more additional pixels are not collinear to the particular pixel.

7. The method of claim 1, wherein determining that the set of pixels form the rectangular grid pattern comprises:
  determining a first distance from a first pixel of the set of pixels closest to the pivot pixel within a row of the digital image;
  determining a second distance from a second pixel of the set of pixels closest to the pivot pixel within a column of the digital image;
  determining that a first plurality of pixels collinear with the pivot pixel within the row of the digital image are positioned at intervals of first distance;
  determining that a second plurality of pixels collinear with the pivot pixel within the column of the digital image are positioned at intervals of the second distance; and
  determining that the set of pixels forms the rectangular grid pattern.

8. The method of claim 1, wherein reconstructing the pattern object comprises determining the pattern object from the pattern cell in response to determining that a difference between the digital image and a reconstructed digital image comprising a plurality of repeating instances of the pattern cell is below an error threshold.

9. The method of claim 1, wherein reconstructing the pattern object comprises modifying the pattern cell to center a boundary of the pattern cell around the pattern object by:
  detecting background pixels of the pattern cell and object pixels of the pattern object by comparing boundary pixels of a sliding window corresponding to the pattern cell to adjacent pixels outside the sliding window; and
  determining the pattern object according to a position of the sliding window relative to the pattern object and the detected background pixels of the pattern cell.

10. A system comprising:
  a memory component; and
  a processing device coupled to the memory component, the processing device to perform operations comprising:
    generating, for pixels of a digital image, neighborhood descriptors comprising pixel values within neighborhoods of the pixels of the digital image;
    determining a set of pixels corresponding to neighborhood descriptors with pixel values within a threshold that form a rectangular grid pattern comprising a pattern cell within the digital image;
    determining, utilizing a sliding window corresponding to the pattern cell, one or more portions of the pattern cell corresponding to a background of the digital image and one or more portions of the pattern cell corresponding to a pattern object; and
    modifying a boundary of the pattern cell to center the pattern object within the pattern cell.

11. The system of claim 10, wherein generating the neighborhood descriptors comprises generating, for a particular pixel of the digital image, a neighborhood descriptor comprising a vector of a plurality of pixel values of pixels within one or more predetermined distances of the particular pixel.

12. The system of claim 11, wherein determining the set of pixels that form the rectangular grid pattern comprises:
  determining an additional pixel corresponding to an additional neighborhood descriptor within the threshold of the neighborhood descriptor of the particular pixel; and
  adding the additional pixel to the set of pixels in response to determining that the additional pixel is collinear with the particular pixel in a row of pixels of the digital image or in a column of pixels of the digital image.

13. The system of claim 12, wherein determining the additional pixel comprises determining that pixels in a vector corresponding to the additional neighborhood descriptor are within a threshold value of corresponding pixels in a vector corresponding to the neighborhood descriptor of the particular pixel.

14. The system of claim 10, wherein determining the one or more portions of the pattern cell corresponding to the background and the one or more portions of the pattern cell corresponding to the pattern object comprises:
  determining a pixel difference by comparing a neighborhood descriptor of a boundary pixel at a boundary of the sliding window to a neighborhood descriptor of an adjacent pixel outside the boundary of the sliding window; and
  determining that the boundary pixel corresponds to the background or the pattern object based on the pixel difference.

15. The system of claim 10, wherein modifying the boundary of the pattern cell comprises:
  determining a gutter region comprising a contiguous background region in response to determining the one or more portions of the pattern cell corresponding to the background of the digital image; and
  centering the pattern object within the pattern cell based on the gutter region.

16. The system of claim 10, wherein the operations further comprise:
  generating a vector-based pattern cell comprising the pattern object in response to a request to vectorize the digital image, the digital image comprising a digital raster image; and
  inserting, into a digital vector image, a modifiable pattern comprising one or more instances of the vector-based pattern cell.

17. A non-transitory computer readable medium comprising instructions, which when executed by a processing device, cause the processing device to perform operations comprising:
  generating, for a pixel of a digital image, a neighborhood descriptor comprising pixel values within a neighborhood of the pixel;

determining, for the pixel in the digital image, a set of pixels within a column and a row of the pixel corresponding to neighborhood descriptors within a threshold of a neighborhood descriptor of the pixel;

determining that the set of pixels form a rectangular grid pattern comprising a pattern cell within the digital image; and reconstructing a pattern object by modifying a boundary of the pattern cell.

18. The non-transitory computer readable medium of claim 17, wherein determining the set of pixels comprises:

determining and initial set of pixels comprising pixels corresponding to neighborhood descriptors within the threshold of the neighborhood descriptor of the pixel;

determining a subset of pixels of the initial set of pixels with overlapping descriptors; and determining the set of pixels based on the initial set of pixels excluding the subset of pixels.

19. The non-transitory computer readable medium of claim 17, wherein determining that the set of pixels form the rectangular grid pattern comprises:

determining, from the set of pixels, a first set of pixels collinear with the pixel within the row;

determining, from the set of pixels, a second set of pixels collinear with the pixel within the column; and determining that the pixel, the first set of pixels, and the second set of pixels form the rectangular grid pattern comprising the pattern cell within the digital image based on first distances between the pixel and the first set of pixels and second distances between the pixel and the second set of pixels.

20. The non-transitory computer readable medium of claim 17, wherein reconstructing the pattern object comprises:

detecting, utilizing a sliding window corresponding to the pattern cell, a background portion and a pattern object portion within the pattern cell; and modifying the boundary of the pattern cell to center the pattern object within the pattern cell according to the background portion and the pattern object portion detected within the pattern cell.

* * * * *